United States Patent
Moore et al.

(10) Patent No.: US 7,585,532 B2
(45) Date of Patent: Sep. 8, 2009

(54) APPARATUS AND METHOD FOR IMPROVING THE DIMENSIONAL QUALITY OF EXTRUDED FOOD PRODUCTS HAVING COMPLEX SHAPES

(75) Inventors: Gary Steven Moore, McHenry, IL (US); Jorge C. Morales-Alvarez, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 778 days.

(21) Appl. No.: 10/932,225

(22) Filed: Sep. 1, 2004

(65) Prior Publication Data
US 2005/0048180 A1 Mar. 3, 2005

Related U.S. Application Data

(63) Continuation-in-part of application No. 10/623,048, filed on Jul. 18, 2003, now Pat. No. 6,854,970, which is a continuation-in-part of application No. 10/047,503, filed on Oct. 29, 2001, now Pat. No. 6,620,448.

(51) Int. Cl.
A23P 1/14 (2006.01)
(52) U.S. Cl. .................. 426/446; 426/449; 426/516; 426/517; 426/518
(58) Field of Classification Search ......... 426/445–450, 426/496, 516–518; 425/113–114, 376.1, 425/377, 380, 382 R, 382.4, 461, 464
See application file for complete search history.

(56) References Cited

U.S. PATENT DOCUMENTS 449,854 A 4/1891 Herrold 2,764,995 A 10/1956 Krupp et al.

(Continued)

FOREIGN PATENT DOCUMENTS

CA 1230005 12/1987

(Continued)

OTHER PUBLICATIONS

P. Colonna, J. Tayeb, C. Mercier, Extrusion Cooking of Starch and Starchy Products, Extrusion Cooking, 2001, chapter 9, pp. 247, 263, 264, 265, 310, Harper Woodhead Publishing, Cambridge, UK.

(Continued)

Primary Examiner—Drew E Becker
(74) Attorney, Agent, or Firm—James R. Gourley; Carstens & Cahoon, LLP

(57) ABSTRACT

The present invention comprises an improved extruder die assembly and method for using same to improve the quality of dimensional design aspects of extruded, complexly shaped, direct expanded food products. The improved system includes an improved die assembly comprising a first die and a second die having at least one orifice. A majority of the total pressure drop occurs in the first die to pre-expand the dough prior to the dough entering the second die. The orifices in the first die can be individually configured to obtain differing dough flow speeds resulting in a desired flow pattern. A plurality of extruded dough ropes formed at each orifice exit of the first die can meld together in the bore and exit the second die. Color or flavor can be added at the first die to enhance the food product.

20 Claims, 16 Drawing Sheets

U.S. PATENT DOCUMENTS

| | | | |
|---|---|---|---|
| 2,858,217 A | 10/1958 | Benson | |
| 2,858,219 A | 10/1958 | Benson | |
| 3,054,677 A | 9/1962 | Graham, Jr. et al. | |
| 3,228,356 A | 1/1966 | Schafer | |
| 3,314,381 A | 4/1967 | Fries et al. | |
| 3,345,186 A | 10/1967 | Kania et al. | |
| 3,447,931 A | 6/1969 | Benson et al. | |
| 3,462,277 A | 8/1969 | Reinhart | |
| 3,496,858 A * | 2/1970 | Jenkins | 426/634 |
| 3,622,353 A | 11/1971 | Sharnbrook et al. | |
| 3,664,779 A * | 5/1972 | La Warre | 425/4 R |
| 3,779,676 A | 12/1973 | Bernard | |
| 3,870,805 A * | 3/1975 | Hayes et al. | 426/656 |
| 3,885,053 A | 5/1975 | Townsend | |
| 3,991,217 A | 11/1976 | Kinney | |
| 4,025,260 A | 5/1977 | Neel | |
| 4,051,162 A | 9/1977 | Rose et al. | |
| 4,061,786 A | 12/1977 | Winkler et al. | |
| 4,128,372 A * | 12/1978 | Rose et al. | 425/311 |
| 4,293,575 A * | 10/1981 | Cockram et al. | 426/104 |
| 4,395,217 A | 7/1983 | Benadi | |
| 4,484,877 A | 11/1984 | Stucke et al. | |
| 4,534,992 A * | 8/1985 | Taguchi et al. | 426/656 |
| 4,542,686 A | 9/1985 | Bansal | |
| 4,614,489 A | 9/1986 | Juravic | |
| 4,626,187 A | 12/1986 | Kamada | |
| 4,695,236 A | 9/1987 | Predohl et al. | |
| 4,715,803 A | 12/1987 | Koppa | |
| 4,835,000 A | 5/1989 | Kehoe | |
| 4,869,911 A | 9/1989 | Keller | |
| 4,900,572 A | 2/1990 | Repholz et al. | |
| 4,940,593 A | 7/1990 | Duffy | |
| 4,954,061 A | 9/1990 | Repholz et al. | |
| 5,019,404 A | 5/1991 | Meisner | |
| 5,062,782 A | 11/1991 | Tompkins et al. | |
| 5,066,435 A | 11/1991 | Lorenz et al. | |
| 5,102,602 A | 4/1992 | Ziegler | |
| 5,110,276 A | 5/1992 | Farnsworth et al. | |
| 5,120,554 A | 6/1992 | Farnsworth et al. | |
| 5,149,555 A * | 9/1992 | Flindall | 426/448 |
| 5,185,382 A | 2/1993 | Neumann et al. | |
| 5,208,059 A | 5/1993 | Dubowik et al. | |
| 5,208,267 A | 5/1993 | Neumann et al. | |
| 5,216,946 A | 6/1993 | Huang et al. | |
| 5,248,702 A | 9/1993 | Neumann et al. | |
| 5,262,190 A | 11/1993 | Cunningham et al. | |
| 5,296,247 A | 3/1994 | Huang et al. | |
| 5,304,055 A | 4/1994 | Van Lengerich et al. | |
| 5,417,992 A | 5/1995 | Rizvi et al. | |
| 5,435,714 A | 7/1995 | Van Lengerich et al. | |
| D368,791 S | 4/1996 | Laughlin | |
| 5,518,749 A | 5/1996 | Weinstein | |
| 5,538,744 A | 7/1996 | Miller et al. | |
| D372,352 S | 8/1996 | Laughlin | |
| D373,671 S | 9/1996 | Laughlin et al. | |
| 5,620,713 A * | 4/1997 | Rasmussen | 425/131.1 |
| 5,639,485 A | 6/1997 | Weinstein et al. | |
| 5,643,618 A | 7/1997 | Huberg et al. | |
| D384,785 S | 10/1997 | Laughlin | |
| 5,686,128 A | 11/1997 | Tracy et al. | |
| 5,720,987 A | 2/1998 | Ploog | |
| 5,759,603 A | 6/1998 | Francisco et al. | |
| 5,827,557 A | 10/1998 | Weinstein et al. | |
| 5,843,503 A | 12/1998 | Clanton et al. | |
| 5,891,502 A | 4/1999 | Heck et al. | |
| 5,955,116 A | 9/1999 | Kehoe et al. | |
| 6,110,511 A | 8/2000 | Rollins et al. | |
| RE36,937 E | 10/2000 | Mackley | |
| 6,143,338 A | 11/2000 | Weinstein et al. | |
| 6,143,339 A | 11/2000 | Weinstein et al. | |
| 6,143,342 A | 11/2000 | Weinstein et al. | |
| 6,187,237 B1 | 2/2001 | Kirjavainen et al. | |
| 6,251,452 B1 * | 6/2001 | Weinstein et al. | 426/249 |
| 6,277,425 B1 | 8/2001 | Nash et al. | |
| 6,296,465 B1 | 10/2001 | Deutsch et al. | |
| 6,309,686 B1 | 10/2001 | Zietlow et al. | |
| 6,387,421 B1 | 5/2002 | Clanton et al. | |
| 6,509,049 B1 * | 1/2003 | Parsons et al. | 426/250 |
| 6,620,448 B2 | 9/2003 | Keller et al. | |
| 6,632,466 B2 | 10/2003 | Roussel et al. | |
| 6,783,787 B2 | 8/2004 | Bortone | |

FOREIGN PATENT DOCUMENTS

WO     WO 02/069739     9/2002

OTHER PUBLICATIONS

Michaeli, Walter, Fundamental Equations for Simple Flows, Extrusion Dies for Plastics and Rubber, 2003, chapter 3, Hansen Gardner, Cincinnati, Ohio.

APV Baker, Inc., Food Extrusion Course, Apr. 5-8, 1988.

* cited by examiner

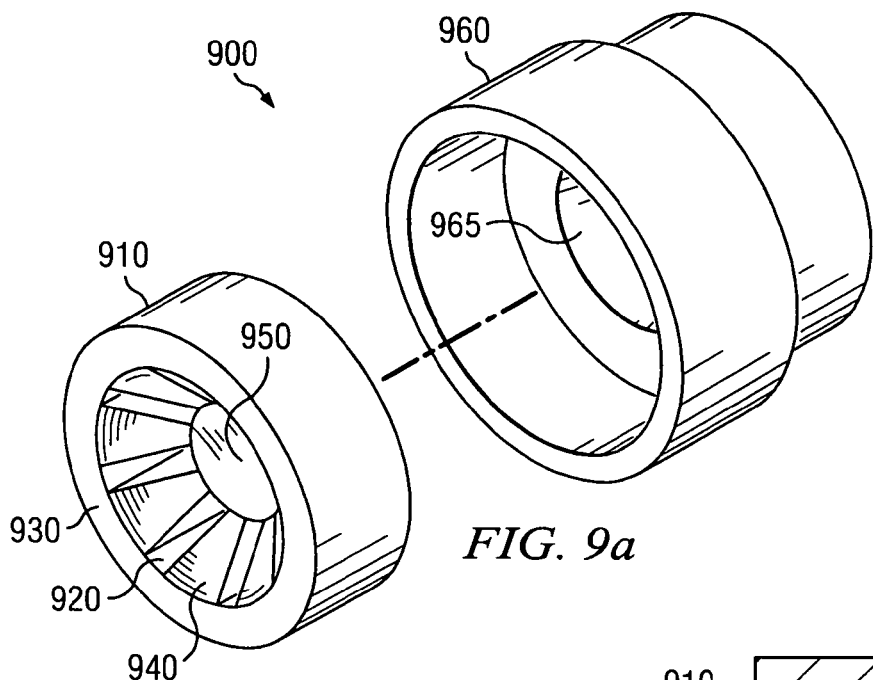
FIG. 9a
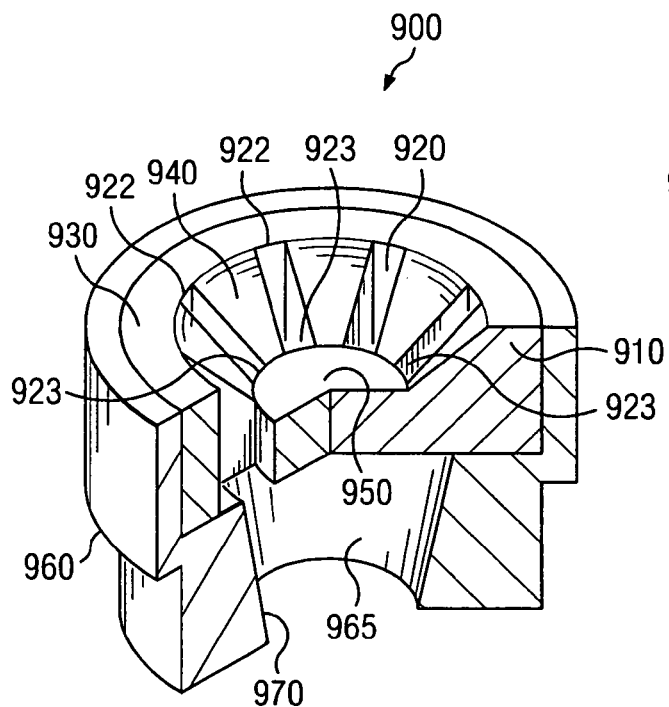
FIG. 9b
FIG. 9c
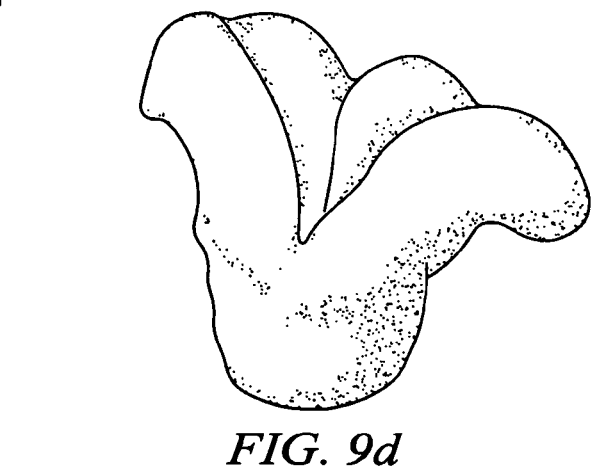
FIG. 9d

APPARATUS AND METHOD FOR IMPROVING THE DIMENSIONAL QUALITY OF EXTRUDED FOOD PRODUCTS HAVING COMPLEX SHAPES

This application is a continuation-in-part of U.S. patent application Ser. No. 10/623,048 filed on Jul. 18, 2003 now U.S. Pat. No. 6,854,970, which was a continuation-in-part of U.S. patent application Ser. No. 10/047,503 filed on Oct. 29, 2001 and subsequently issued as U.S. Pat. No. 6,620,448, the technical disclosures of which are incorporated by reference.

BACKGROUND OF THE INVENTION

1. Technical Field

The present invention generally relates to an apparatus and method for improving the dimensional quality of extruded food products. More specifically, the present invention relates to an apparatus and method that utilizes pre-expansion for improving the dimensional quality of extruded food products having complex shapes. In one aspect, the present invention relates to a method and apparatus to impart a distinct colored and/or flavored pattern into an extruded food product having superior dimensional aspects.

2. Description of the Related Art

The use of extrusion devices in the preparation of direct expanded food products is long practiced. Utilized to produce a variety of products such as ready-to-eat (R-T-E) cereals, snack foods and confections, extrusion remains prominent among food processes because of its versatility and efficiency.

Food processes utilizing extrusion devices typically include an edible substance such as dough which is introduced into a device and conveyed via a screw pump to an inlet where the substance is forced through an extruder die assembly. The extruder die assembly may perform a variety of functions: it may form or shape the extrudate; it may divide the extrudate into multiple extrudates; it may inject an additive substance into the extrudate; and it may compress and reduce the cross-sectional area of the extrudate.

Examples of devices used for extrusion of food products are illustrated in U.S. Pat. Nos. 2,858,217; 3,314,381; and 5,639,485. While extrusion dies have evolved over the years, the method by which an additive substance is supplied and injected into the extrudate has remained essentially unchanged.

For Example, in U.S. Pat. No. 2,858,217 to Benson, the introduction of coloring matter, such as a colored liquid dye, is accomplished via a series of apertures 40, 42, 44 disposed in the bridging strips 32, 34, 36 and supplied by horizontal passages 52, 54, 55 which are in fluid communication with the dye reservoir 46. The supplying of the liquid dye from the dye reservoir 46 to series of apertures 40, 42, 46 is by means of gravitational force. According to the Benson '217 device, dough material 18 is extruded through a divider block 22 which forces the dough material 18 to divide or spread around the bridging strips 32, 34, 36 so that voids 38 are formed into which the coloring matter is introduced via the series of apertures 40, 42, 44.

Similarly, in U.S. Pat. No. 3,314,381 to Fries et al., the fluid injection assembly is comprised of a hollow tubular injection member 29 in a helical spiral configuration, which includes a bore 37 through which pressurized injection fluid is supplied from a source 25 to a plurality of longitudinally spaced bores 39 into a distributing channel 38. The fluid along the length of channel 38 is injected into the passing dough as a substantially longitudinally continuous spiral band extending from substantially the central axis of the dough to either the outer face of the dough or a point short thereof. However, the Fries et al. '381 device is primarily adapted to relatively low pressure comestible extrusions.

U.S. Pat. No. 5,639,485 to Weinstein et al. and its related patents, disclose a method and apparatus for adding additives in flowing dough to make complexly patterned multicolored extrudates. The Weinstein et al. '485 invention and its progeny all disclose a high pressure extrusion device comprising an extruder die insert 20 which includes means for imparting at least one interstitial gap in the flowing dough by means of a plurality of dividing passageways (e.g., 44, 45, 46) formed by die dividing members 47. An additive (e.g., a food color or a second colored dough) may be injected via a plurality or array of evenly spaced food color injection ports 48 formed on the downstream side of die dividing member 47. The injection ports 48 are in fluid communication with a pressurized color supply 18 by means of supply ports 52, 54, 56 and supply passageway 50. The color fluid tends to fill the interstitial gaps in the flowing dough between passageways (e.g., 44, 45, 46) formed by and behind the die dividing members 47 to create a line in the shape of dividing members 47 in the extruded dough. The die insert 20 also includes notches 57 which are used to isolate the color fluid injected into the interstitial gap from spreading to the interior surface wall of die insert 20 thereby reducing if not eliminating the leakage of color fluid onto the outside of the extruded dough. Additionally, the die insert 20 can further include a means for sealing (e.g., "O" rings 60 and 62 as depicted) the color fluid supply reservoir 58 against premature admixture with dough.

The utilization of notches 57, sealing means 60, 62, and multiple enclosed injection ports 48 further complicates the design of the die insert making it harder to clean and maintain. Finally, injecting color fluid at discrete locations into downstream voids or interstitial gaps to disperse the fluid in a generally uniform manner requires precise control of flow rates, internal pressures, and viscosity of the extrudate and various additives. Furthermore, the design of each die insert 20 is limited to the physical constraints imposed by the previously mentioned design elements.

APV Baker, Inc., in an article presented at several Food Extrusion conferences in 1988, and partially authored by one of the inventors of the present application, discloses a technique for filling an extruded food product outside of a "double die" or in post extrudate operations. In the "double die" system, product expands out of one die opening into another die cavity where it is molded into a particular shape while it is still flexible. FIG. 6a is a perspective view of an embodiment of the prior art die assembly discussed in the APV Baker article. FIG. 6b is a side view of the prior art die assembly depicted in FIG. 6a. Referring to FIG. 6b, when the first die 605 is attached to the second die 665, the cylinder 615 fills a portion of the second die bore 665 and orifice 675 and extends out past the exit of the orifice 675. The orifice 675 and cylinder 615 form an annular open area at the exit of the orifice 675. As the individual ropes from the first die orifices 625 expand due to vapor flashing, the converging bore 665 of the second die restrains radial expansion and creates a hollow tube made up of multiple ropes as illustrated in FIG. 6c. A hollow cylinder 615 can be used to inject an additive substance into the hollow portion 682 of the tube. However, because the technique relates to an internal filling, it fails to disclose a way to impart a visibly distinct colored and/or flavored pattern into an extrudable food mass during extrusion. The APV Baker die assembly works best for co-extrusion of a cereal tube with a viscous creme or fruit filling. With co-extrusion, the nozzle 615 protrudes past the die face 675 so that the filling is being pumped into a low-pressure area 617. If the injection nozzle 615 stops short of the die face 675, then the filling injection has to overcome the higher pressure within the die cavity 665. Further, because the cylinder 615 extends out past the exit of the orifice 675, a rotating die face cutter cannot be used with the disclosed die assembly. Rather, a guillotine type cutter must be used, somewhere downstream of the cylinder 615 after the extruded food piece 680 has cooled and further solidified. Use of a guillotine type cutter following further solidification of an extruded food product results in a less clean, more fractured cut. What is needed is an extruder die assembly capable of mixing an additive substance at a variety of operating pressures which has improved seal characteristics and is simpler and easier to maintain.

Extruder die assemblies have also been used to apply a shape to a food product. FIG. 7a shows the exit face 752 of a potential forming die 750 used in a prior art extruder die assembly. Included within the periphery of the exit face 752 is a complexly shaped exit port 754. Upon exiting an extruder die assembly, the extruded mass is directly expanded (e.g., via flash puffing), both outwardly (transversely) in a radial direction, and longitudinally (axially) in the direction of flow. The flashed vapor is typically not captured and is thus vented to ambient air once the extruded mass has exited the die assembly. The extruded mass can then be cut into individual pieces using a rotating blade mechanism. The resulting individual pieces typically have a uniform, puffed shape with a cross-sectional shape that generally corresponds to the expanded outline of the die exit port. While the characteristics of the resulting individual pieces are satisfactory for simple geometric shapes (e.g., spheres, ovoids, and crescents), the design details of more complex shapes tend to be obscured or eliminated.

For example, the outline 756 of exit port 754 is designed to resemble a dog with two distinct legs, a neck, a body, a head, and a tail. When the forming die 750 is utilized in conjunction with a conventional direct expanded food process, the resulting product is a uniformly puffed food piece 780 as shown in FIG. 7b. While the shape of the outline 756 of exit port 754 is somewhat discernable in food piece 780, the design details of the two distinct legs, neck, and tail are generally diminished and obscured. The individual dimensional aspects of the two legs, neck, and tail are simply absorbed by the dimensional aspects of the body areas of the outline 756 of exit port 754 because, in part, of the radial expansion that occurs as the dough exits the die assembly.

One solution used to try to solve this problem was to simply further narrow the areas of the exit port where narrower aspects are desired in the food piece 780 in an effort to compensate the radial expansion. For example, the outline 756 of the exit port 754 could be further narrowed in the areas depicting the neck, leg, and tail. This option fails, however, because the driving force required through the narrow areas is much larger than the driving force required to force dough through the main body area. As a result, the extruded mass flows through the path of least resistance, which in FIG. 7a is the main body area of the dog. Substantially less extruded mass flows through the narrow areas.

One approach of imparting illustrations upon a food product is disclosed by U.S. Pat. No. 5,620,713 assigned to Pillsbury. The Pillsbury patent discloses a die set having an inner die and an outer die. The inner die is formed in a desired shape such as an animal or toy and the outer die has an annular opening surrounding the inner die. However, the outer shape of the food product is still determined by the outer die. The resultant dough dog must be sliced to observe the internal cross-sectional shaped animal or toy. In addition, at least two different doughs must be used. Further this technology requires cookie dough formulations, operates in a region of lower pressure and temperatures, and generates no flash-off expansion as the dough exits the die.

Similarly, U.S. Pat. No. 6,296,465, assigned to Nestec, discloses an extrusion die that produces a three-dimensional shape, having the general shape of a core surrounded by a ring. The core is extruded through a central outlet orifice and is surrounded by the ring extruded through an annular outlet orifice that surrounds the central outlet orifice. Prior to exiting the orifices, the extrudate first enters a convergent wall feed diaphragm, then it enters a divergent wall distribution chamber where it splits into two streams. From the divergent wall distribution chamber, the first stream enters the central duct by means of a circular central pre-expansion diaphragm. The second stream enters the conical convergent coaxial tubular extrusion duct by means of an annular pre-expansion member. The first stream eventually exits the central outlet orifice and the second stream eventually exits the annular outlet orifice. The resultant extruded product has the general shape of a core, surrounded by a ring, best illustrated by FIGS. 6a-6f of the Nestec Patent. The Nestec Patent, however, fails to disclose a method that provides desired outer narrow feature design details for extruded, complexly shaped food products. The Nestec Patent also does not utilize steam flash-off from the extrudate while contained within the walls of the second die, but rather relies upon steam vaporization and dough expansion that occurs at the exit of die nozzle 90. "Pre-expansion" as defined in the patent appears to refer to controlling the flow rate of dough prior to expansion.

Other prior art solutions, as disclosed in U.S. Pat. No. 5,304,055, issued to Nabisco (Nabisco I) and U.S. Pat. No. 5,435,714 also issued to Nabisco (Nabisco II) disclose an apparatus that utilizes a first cutting means to partially cut across the die orifice so that the extrudate rope is partially cut at an angle transverse to the direction of flow and then utilizes a second cutting means across the entire orifice to completely cut each of the partially cut extrudate ropes into individual pieces. The Nabisco patents relate only to the cutting apparatus to create three-dimensional shapes. In addition, the Nabisco Patents fail to solve the problem of diminished features due to expansion at the die, or reduced flow through narrow die areas. Further, the three-dimensional shapes that can be produced by introducing a single partial cut into a food extrudate are extremely limited.

Another extruder die assembly is illustrated in U.S. Pat. No. 3,054,677, assigned to The Quaker Oats Company, which discloses a method for making a dry, ready to eat cereal product by extruding a plurality of ropes or strands through a series of closely aligned orifices in a closed path configuration whereby the extruded strands expand to contact with each other and pass through a cutting device to form hollow, pillow shaped pieces. Prior to extrusion, a breaker plate is mounted behind a screen pack to increase the shearing action and further increase the backpressure. Because the expansion occurs in the open atmosphere after the extruding die, however, the flashed vapor is not captured and is thus vented to ambient air once the extruded mass has exited the die assembly. As a result, the dough strands do not adhere together as well as they would in an enclosure. Further, the '677 patent requires a separate rotary cutting device away from the die assembly which requires more equipment and floor space. In addition, the rotary cutting device disclosed in the '677 patent limits the shapes of the resultant food products to crimped, pillow-like shapes. What is needed is a die assembly that can enable a rotating die face cutter to cut multiple stranded, adhered, and extruded dough products.

Consequently, a need exists for an improved apparatus and method for enhancing the quality of dimensional design aspects of extruded, complexly shaped food products. The improved method and apparatus should permit novel symmetrical and asymmetrical shapes to be produced. In one embodiment, it should permit pre-expanded extruded dough of various geometries to be formed into a desired shape having a desired texture and then cut by a rotating die face cutter. In one embodiment, it should permit production of extruded food pieces having substantially non-rounded edges. Further, the improved apparatus and method should, in one embodiment, provide a means to add color and/or flavor to the extruded, complexly shaped food products.

SUMMARY OF THE INVENTION

The present invention overcomes many of the shortcomings inherent in previous methods and systems addressing extruder die assemblies. The present invention, in one embodiment, comprises an improved extruder die assembly and method for using same to impart a distinct colored and/or flavored pattern into an extrudable food mass during the extrusion process.

The present invention, in one embodiment, comprises an improved extruder die assembly and method for using same to improve the quality of dimensional design aspects of extruded, complexly shaped, direct expanded food products.

In one embodiment, the system comprises an extruder die assembly and method for using same in which the first die comprises a forming section and an injection section fabricated as a matching set. When properly aligned and coupled, the matching set forms a peripheral reservoir manifold, internal to the die assembly, through which a fluid additive may be supplied via a supply port to at least one, and more preferably, a plurality of capillary channels which in turn impart a distinct cross-sectional design into a flowing mass of a first extrudate.

In another embodiment, the system and method for using the present invention includes partitioning the internal peripheral reservoir manifold so that a plurality of supply ports may be used to allow different colors and/or flavors to be injected at different locations in the distinct cross-sectional design.

In another embodiment, the system and method for using same utilizes the first die comprising multiple matched sets of forming sections and injection sections in tandem to impart multiple pattern designs into an extrudable food mass.

In another embodiment, the system and method for using same utilizes multiple matched sets of forming sections and injection sections in tandem to impart multiple pattern designs of differing colors and/or flavors into an extrudable food mass.

In another embodiment, the system and method for using same utilizes a converging nozzle to decrease the extrudate's cross-sectional area while maintaining the distinct cross-sectional design pattern imparted into the extrudate.

Thus, in accordance with one feature of the invention, the present invention is comprised of an extruder die assembly capable of operating at a variety of operating pressures which has improved seal characteristics and is simpler and easier to maintain. Moreover, the performance of the extruder die assembly of the present invention is more stable in that surging of the fluid additive is inhibited thereby resulting in a continuous well defined pattern being injected into the extrudable food mass.

In accordance with another feature of the invention, the present invention is comprised of an extruder die assembly whose injection mechanism is less prone to clogging and blockages. The system of the present invention allows the flow of the fluid additive to be momentarily halted without permanently plugging the supply passageways or injection section(s).

A novel feature of the invention is an injection nozzle which supplies fluid additives from an exterior pressurized source to a supply port formed in the extruder die assembly. The subject injection nozzle exhibits superior sealing qualities in conjunction with simplicity and flexibility. The minimal affected space required to receive the subject injection nozzle allows a single extruder die assembly to have more than one supply port fashioned therein. Thus, multiple injection nozzles may be used to supply a single extruder die assembly with multiple colors and/or flavors. The injection nozzle of the present invention also exhibits a unique dual seal characteristic, which is particularly effective in conditions involving high temperature. The subject injection nozzle is also highly flexible in that one injection nozzle may be used interchangeably with another (i.e., each injection nozzle is not unique to a particular supply port).

In one embodiment, the improved system includes an improved extruder die assembly comprising a first die having at least one orifice connected to a second die having at least one orifice. In one embodiment, extrusion through the first die orifices results in a plurality of pre-expanded extruded ropes. Upon exiting the first die, the pre-expanded extruded ropes flash vapor. In one embodiment, the flashed vapor or steam facilitates the adhesive properties of the dough. The pre-expanded extruded ropes then partially adhere together as the extrudate travels through a bore disposed between the first die and second die. The bore restrains radial expansion. By pre-expanding the extrudate in a first die, orifice channel length, placement, size, shape, geometry, and coefficient of friction can be individually configured to optimize the desired shape. For example, by changing the shape and/or size of the first die orifices, differing flow velocities are achieved through the individual orifices, which can produce novel shapes. Further, by changing the size and placement of the first die orifices, specific three-dimensional shapes, such as a snake or dog, can be produced that more closely resemble the target shape. In one embodiment, all radial expansion occurs prior to exit from the second die permitting production of food products having substantially non-rounded edges. Further, by controlling the coefficient of friction on the inlet surfaces of the second die, the texture of the product can be controlled.

In one embodiment, the present invention permits pre-expanded extruded dough of various geometries to be formed into a desired shape having a desired texture and then cut by a rotating die face cutter.

Hence, this invention produces a method and apparatus that enhances the quality of dimensional design aspects and optionally color and flavor aspects of extruded, complexly shaped food products.

BRIEF DESCRIPTION OF THE DRAWINGS

A more complete understanding of the method and apparatus of the present invention may be had by reference to the following detailed description when taken in conjunction with the accompanying drawings, wherein:

FIGS. 5b and 5c are enlarged sectional views of the interface between the extruder die assembly and associated injection nozzle shown in FIG. 5a.

FIG. 6b is a side view of the prior art die assembly depicted in FIG. 6a.

FIG. 9a is a perspective view of an alternate die pattern used in an embodiment of the extruder die assembly of the present invention;

FIG. 9b is a side view of the embodiment of the extruder die assembly shown in FIG. 9a;

FIG. 9c is a partially cut away perspective view of the of the extruder die assembly shown in FIG. 9a;

FIG. 9d depicts the resulting extruded food piece formed by utilizing the extruder die assembly shown in FIGS. 9a-9c;

Figure 1A:
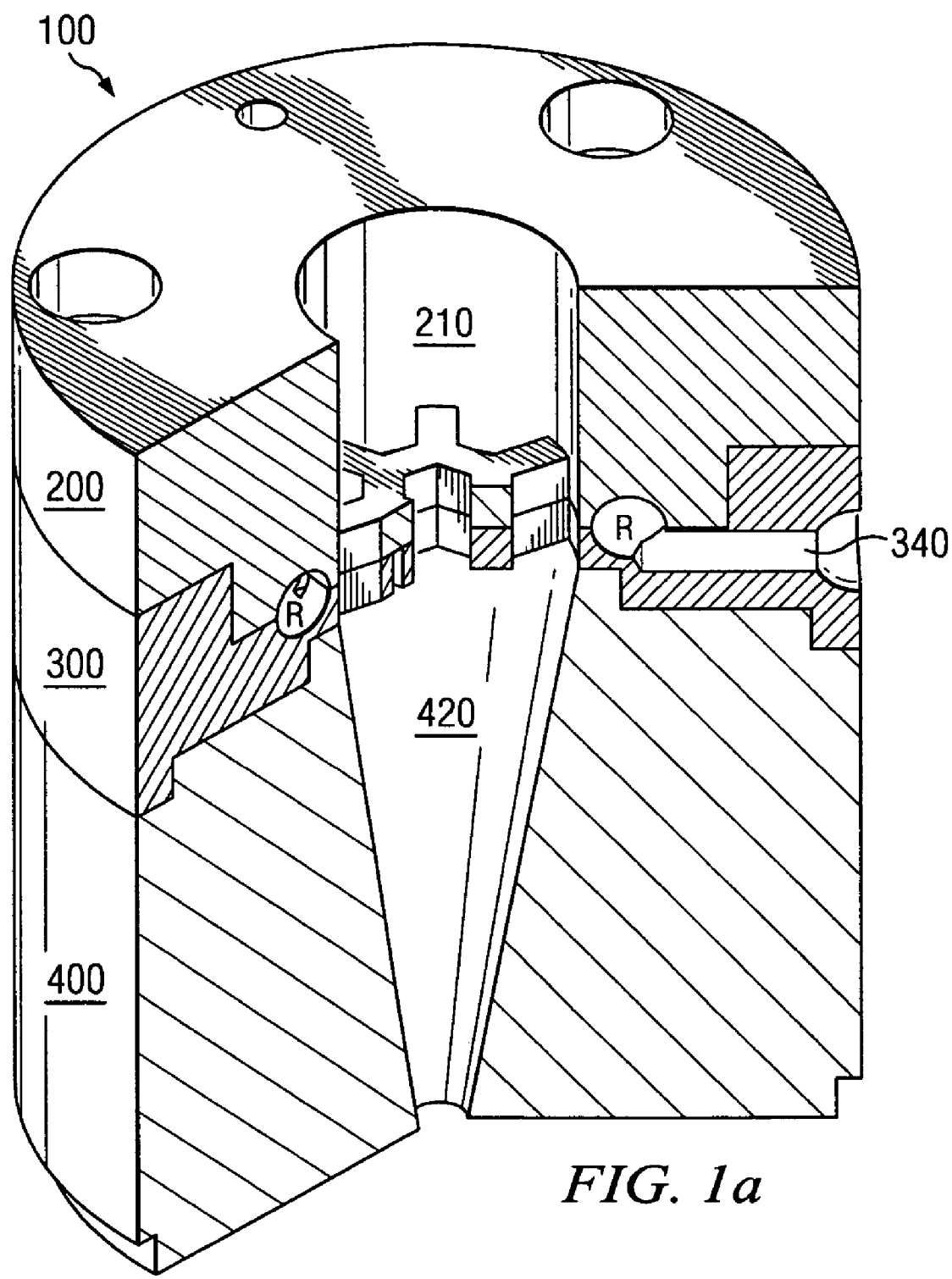
FIG. 1a is a cut-away perspective view of the extruder die assembly of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION

Color/Flavor Injection

Figure 1B:
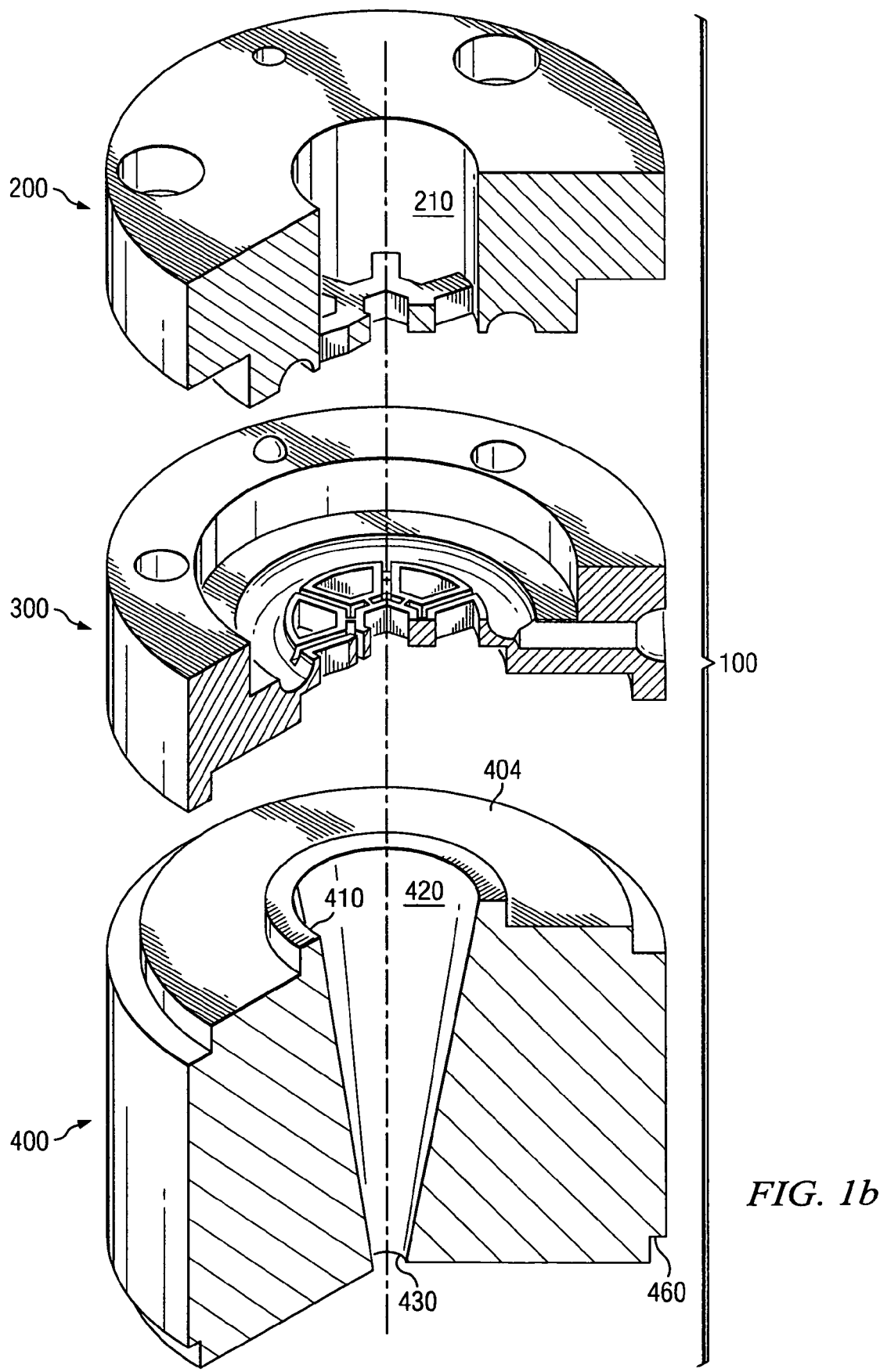
FIG. 1b is a cut-away exploded perspective view of the extruder die assembly of the present invention.

An extruder die assembly, generally indicated by reference character 100 in FIGS. 1a and 1b, includes a forming section 200, an injection section 300, and a nozzle section 400. The three sections comprising the die assembly 100 are, in one embodiment, coaxially aligned and interlocking. Additionally, means for coupling the forming section 200 to the injection section 300 are also included.

The extruder die assembly 100 is designed for adaptation to a wide variety of commercial-grade extrusion devices common in the food industry. The extruder die assembly 100 is inserted into an appropriate compartment within an extrusion device (not shown) such that a first extrudate (e.g., a paste or a cereal dough) is directed down a coaxially aligned passageway 210 within the forming section 200 and combined with a fluid additive (e.g., a food coloring dye or a flowable colored and/or flavored food material) in the injection section 300 via supply port 340 and annular reservoir R, whereupon the resulting food mass is compressed through a converging nozzle bore 420 in the nozzle section 400 to produce an extruded food product containing a distinct colored and/or flavored pattern.

While the embodiment illustrated is shown as being generally cylindrical in shape, the exterior housing of the die assembly 100 may be of any shape necessary for adaptation to commercial-grade extrusion devices common in the food industry. Similarly, while passageway 210 and bore 420 are depicted as having a circular cross sectional area, in other embodiments, passageway 210 and bore 420 can be fabricated with a more complex peripheral configuration to define or define-in-part the exterior shape or configuration of the finished piece, including both regular shapes (e.g., stars, rings, geometric shapes) as well as irregular shapes (e.g., animals, vegetables, objects such as trees, cars, etc.).

Figure 2A:
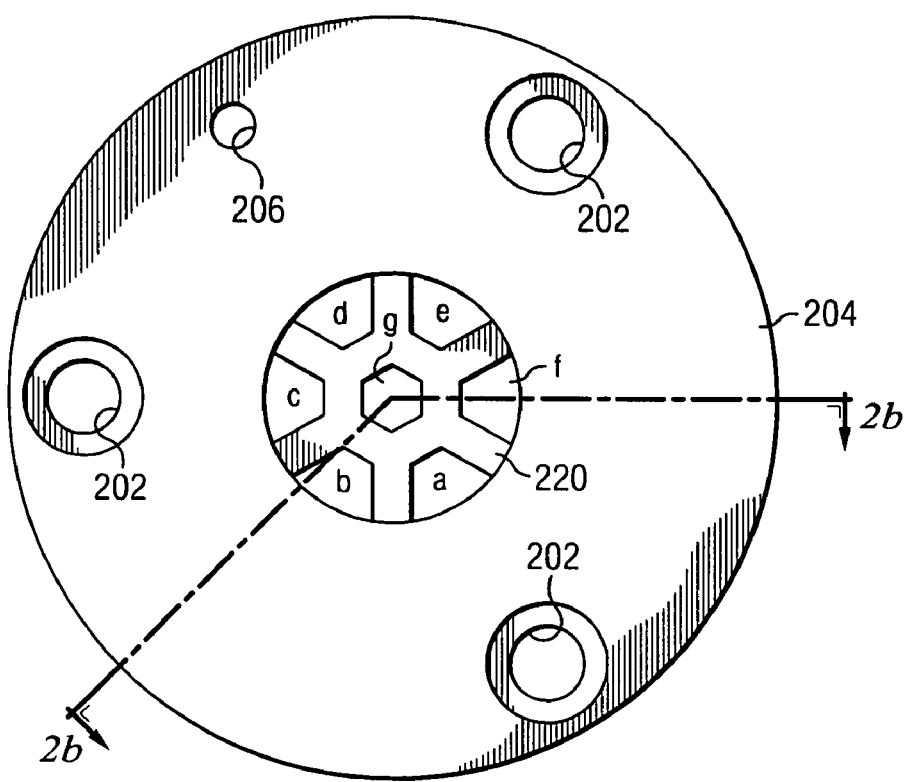
FIG. 2a is an overhead view of the forming section of the extruder die assembly of the present invention.
Figure 2B:
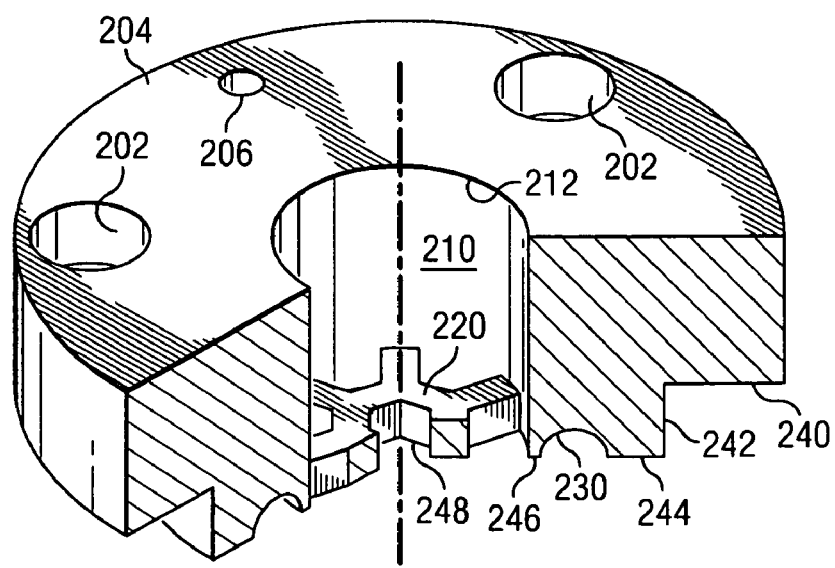
FIG. 2b is a cut-away perspective view of the forming section of the extruder die assembly of the present invention.

Referring to the figures, and in particular FIGS. 2a and 2b, the forming section 200 is a generally tubular flange element having a central bore defining a passageway 210. The inlet 212 of the passageway 210 is adapted to receive a conduit (not shown) supplying a pressurized first extrudate from an extrusion device (not shown). A plurality of counter-sunk coupling holes 202, equally spaced around the periphery of the entrance face 204 of forming section 200, are provided for receiving screws (not shown) for removably coupling the forming section 200 to threaded holes 302 in the injection section 300. An alignment hole 206 extends through the forming section 200 in parallel alignment with the passageway 210 to receive an alignment knob 306 on the entrance face 304 of the injection section 300. When properly seated into the alignment hole 206, the alignment knob 306 ensures that the axial angular alignment of the injection section 300 in relation to the forming section 200 is correct.

The outlet portion of the passageway 210 includes a forming die element 220 which divides the flow of the first extrudate into at least two, and more preferably a plurality of adjacent flowing extrudate passageways such as passageways a-g respectively formed by forming die element 220.

The forming section and injection section are fabricated as a matching set. In general, the outlet portion of the forming section is designed to mate and seal with the inlet portion of the injection section. In one embodiment, an inner peripheral rim formed in the outlet portion of the forming section is specifically designed to slidably couple and align with a central bore in the inlet portion of the injection section. The inner peripheral rim is defined by a peripheral notch formed in the outlet face of the forming section. The peripheral notch is characterized by a peripheral rim wall which is parallel with and generally equidistant from the outer periphery of the central passageway. The inner peripheral rim includes a peripheral groove with a semicircular cross-section. A matching peripheral groove with a semicircular cross-section is formed in the base of the central bore of the inlet portion of the injection section such that when the forming section and injection section are slidably coupled and aligned, an internal peripheral reservoir manifold with a circular cross-section is formed.

Figure 3A:
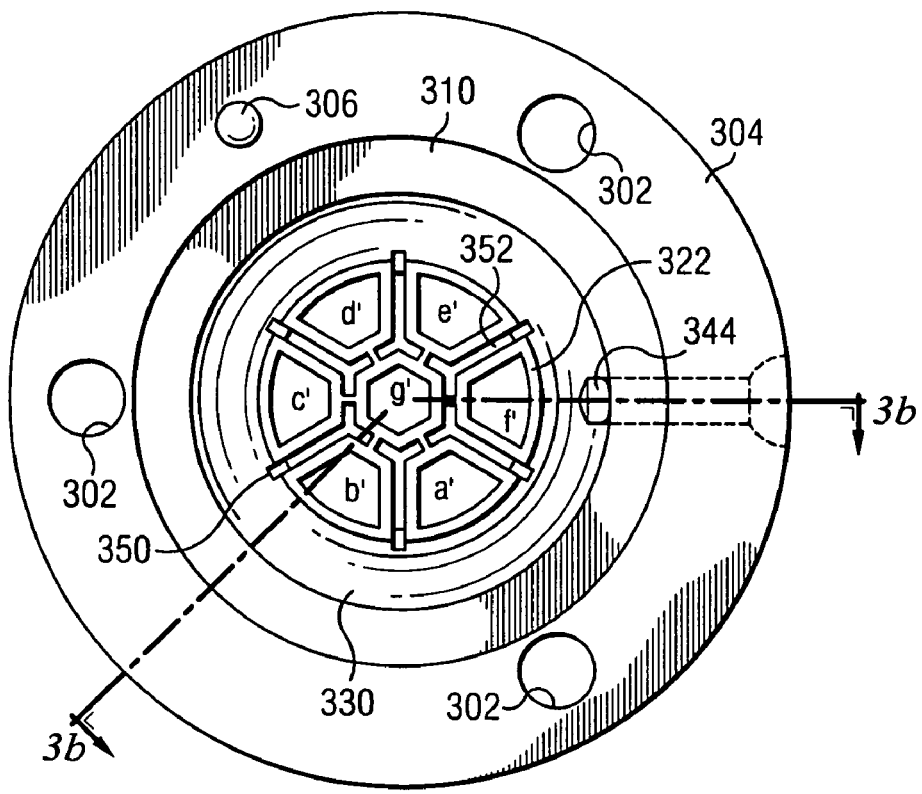
FIG. 3a is an overhead view of the injection section of the extruder die assembly of the present invention.
Figure 3B:
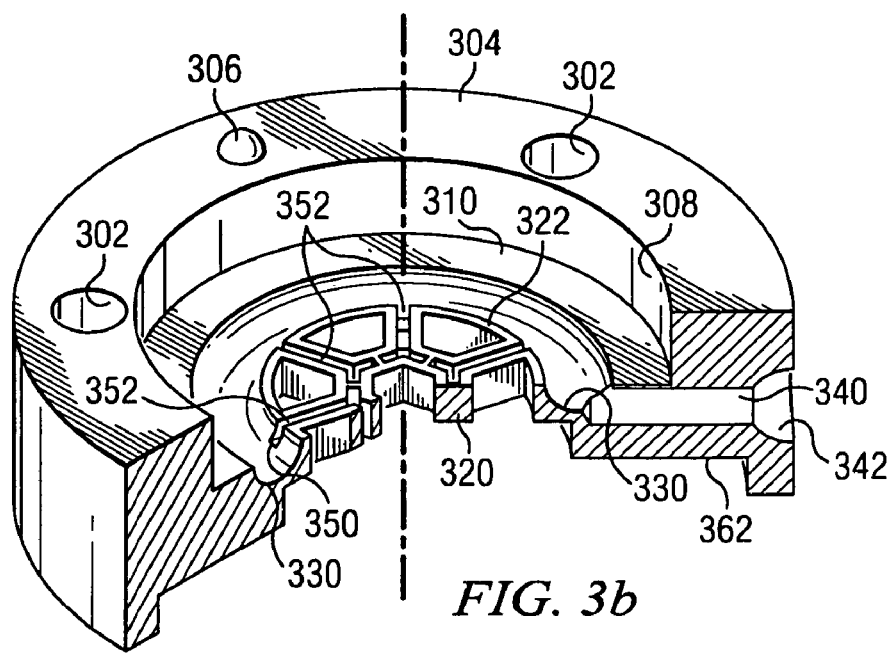
FIG. 3b is a cut-away perspective view of the injection section of the extruder die assembly of the present invention.

Thus, as shown in the figures, and in particular FIGS. 2b, 3a, and 3b, when the present invention is realized in an embodiment having a generally circular cross section, the inner peripheral rim formed in the outlet portion of the forming section 200 is an annular rim defined by an annular notch, characterized by the annular rim wall 242 and the annular outer ring seal face 240, around the outer periphery of the outlet face of the forming section 200. The annular rim in the outlet portion of the forming section 200 slidably fits into a central bore in the inlet portion of the injection section 300 defined by the annular bore wall 308 such that the forming section's annular outer ring seal face 240 seats and seals with the injection section's annular outer seal face 304, the forming section's intermediate annular seal face 244 seats and seals with the injection section's annular intermediate ring seal face 310, and the forming section's inner annular seal face 246 and the exit face 248 of the forming die element 220 seat and seal with the entrance face 322 of the injection section's co-injection die insert 320. Moreover, the matching annular peripheral grooves 230 and 330 form an annular internal peripheral reservoir manifold R into which a fluid additive may be supplied. When properly aligned and coupled, the respective annular seals between the forming section 200 and the matching injection section 300 effectively seal and isolate the fluid additive supplied to the reservoir manifold R from inadvertent leakage to the upstream side of the forming die element 220 and the outer periphery of the extruder die assembly 100.

The injection section 300 includes a co-injection die insert 320 which has profile such that when properly aligned with the forming die element 220, passageways a'-g' are respectively adjoined with passageways a-g formed by forming die element 220. When properly aligned and coupled, the seal between the exit face 248 of the forming die element 220 and the entrance face 322 of the injection section's co-injection die insert 320 ensures that the respective adjacently flowing extrudate passageways are unobstructed and contiguous and that the fluid additive contained in the reservoir manifold R does not inadvertently leak to the upstream side of the forming die element 220.

The co-injection die insert 320 includes at least one and more preferably a plurality of capillary channels 352 in the space between the plurality of passageways. The capillary channels 352 are fluidly connected to the reservoir manifold R via channel ports 350. The reservoir manifold R is fluidly connected to a pressurized source of fluid additive (not shown) via supply port 340.

When properly aligned and coupled, the seal between the exit face 248 of the forming die element 220 and the entrance face 322 of the injection section's co-injection die insert 320 ensures that the pressurized fluid additive supplied to the annular internal peripheral reservoir manifold R continually charges the capillary channels 352 via channel ports 350 whereupon each capillary channel 352 emits at its downstream exit face a continuous discharge of fluid additive in the general cross-sectional shape of the capillary channel 352 resulting in a continuous band of fluid additive being injected into the transient clefts formed in the first extrudate as it exits the adjacent flowing extrudate passageways such as passageways a'-g'. Upon exiting from the individual adjacent flowing extrudate passageways (e.g., passageways a'-g'), the individual adjacently flowing columns of first extrudate coalesce to enclose the injected bands of fluid additive within a single flow mass thereby imparting a distinct colored and/or flavored pattern into the food mass.

In an alternative embodiment of the present invention, the injection section 300 may include multiple supply ports 340 fluidly connected to separate pressurized sources of fluid additive. In such an embodiment, the annular internal peripheral reservoir manifold R may be divided into multiple segregated quadrants fluidly connecting individual pressurized sources of fluid additive to specific capillary channels 352 allowing a distinct pattern of multiple colors and/or flavors to be imparted into the food mass.

In one embodiment of the present invention, the exit face 362 of the injection section 300 is generally designed to mate and seal with the inlet face of the nozzle section 400. With the exception of the co-injection die insert 320, the inlet face of the nozzle section 400 is essentially a mirror image of the exit face 362 of the injection section 300. In general, the nozzle section 400 includes an inlet with a periphery matching the periphery of the forming section's passageway. The nozzle section further includes a passageway coaxially aligned with the forming section's passageway which converges to an outlet. As the passageway converges, the passageway's cross-sectional decreases while its aspect ratio is generally maintained. Thus as shown in the figures, and in particular FIGS. 1b and 3b, when the present invention is realized in an embodiment having a generally circular cross section, the nozzle section 400 includes an inlet 410 with an inner annular periphery which matches the periphery of the forming section's passageway 210. The nozzle section further includes a passageway 420 coaxially aligned with the forming section's passageway 210 which converges to an outlet 430.

In an actual embodiment having a circular cross section as illustrated in FIG. 1b, the diameter of passageway 420 is reduced from 0.664 inches at inlet 410 to 0.332 inches at outlet 430. In another such embodiment, the diameter of passageway 420 is further reduced from 0.664 inches at inlet 410 to 0.153 inches at outlet 430.

Alternatively, in another embodiment of the present invention, multiple sets of matching forming/injection sections may be adjoined in a tandem or series arrangement. In such an embodiment, the inlet face of a second set's forming section is designed to mate and seal with the exit face of a first set's injection section. Arranging multiple sets of matching forming/injection sections in tandem allows multiple pattern designs of differing colors and/or flavors to be imparted into an extrudable food mass.

Figure 4:
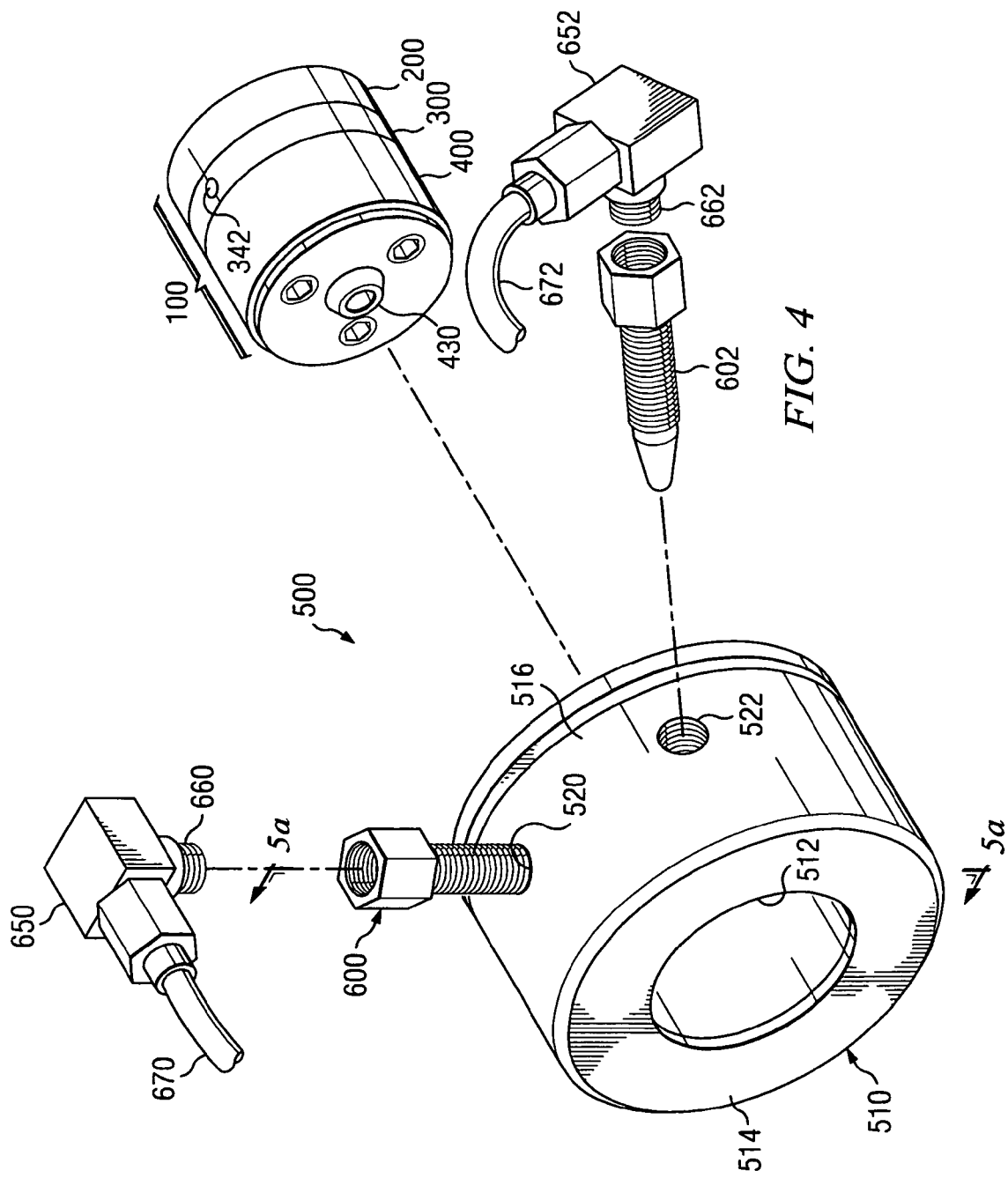
FIG. 4 is a perspective in partially exploded view of the exit face of a die plate assembly attached to a food cooker extruder showing the extruder die assembly of the present invention and associated injection nozzle assemblies.

As previously noted, the extruder die assembly 100 of the present invention is designed for adaptation to a wide variety of commercial-grade extrusion devices common in the food industry. The extruder die assembly 100 is typically inserted into a sealable compartment attached to or within an extrusion device (not shown), such that the inlet 212 of the forming section 200 of the extruder die assembly 100 is connected via a conduit to an output port of the extrusion device. For example, as illustrated in FIG. 4, such a compartment may comprise a die plate assembly 500 attached to the outlet section of a conventional cooker extruder device. The die plate assembly 500 includes a main die plate 510 having a main bore 512 defined therethrough for receiving an extruder die assembly 100. The circumferential dimensions of the main bore 512 is complementary to that of the extruder die assembly 100, so as to ensure a snug fit and eliminate extrudate leakage therebetween. When an extruder die assembly 100 is inserted into the main bore 512 of the main die plate 510, the outlet 430 of the nozzle section 400 protrudes slightly past the exit face 514 of the main die plate 510.

The main die plate 510 also includes an injection port 520 formed in the sidewall 516 of the main die plate 510 for receiving an injection nozzle 600. The injection port 520 extends through the sidewall 516 to the main bore 512 at an angle generally perpendicular to the longitudinal axis of main bore 512. The injection port 520 is further positioned such that when an extruder die assembly 100 is inserted into and properly aligned with the main die plate 510, the injection port 520 aligns with a corresponding supply port inlet 342 formed in the injection section 300 of the extruder die assembly 100. The main die plate 510 may further include additional injection ports (e.g., 522) for receiving additional injection nozzles (e.g., 602), for use with an extruder die assembly 100 having multiple supply port inlets 342 formed in the injection section 300 thereof. When not required, the additional injection ports (e.g., 522) may be sealed with a suitable plug device (not shown).

In addition, the die plate assembly 500 also typically includes a conventional feed plate (not shown) which seals the entrance face of the main die plate 510 and has a passageway defined therethrough which acts as a conduit between the output port of the extrusion device and the inlet 212 of the forming section 200 of the extruder die assembly 100. The feed plate may also provide attachment points for connecting the die plate assembly 500 to the outlet section of the extrusion device.

Figure 5A:
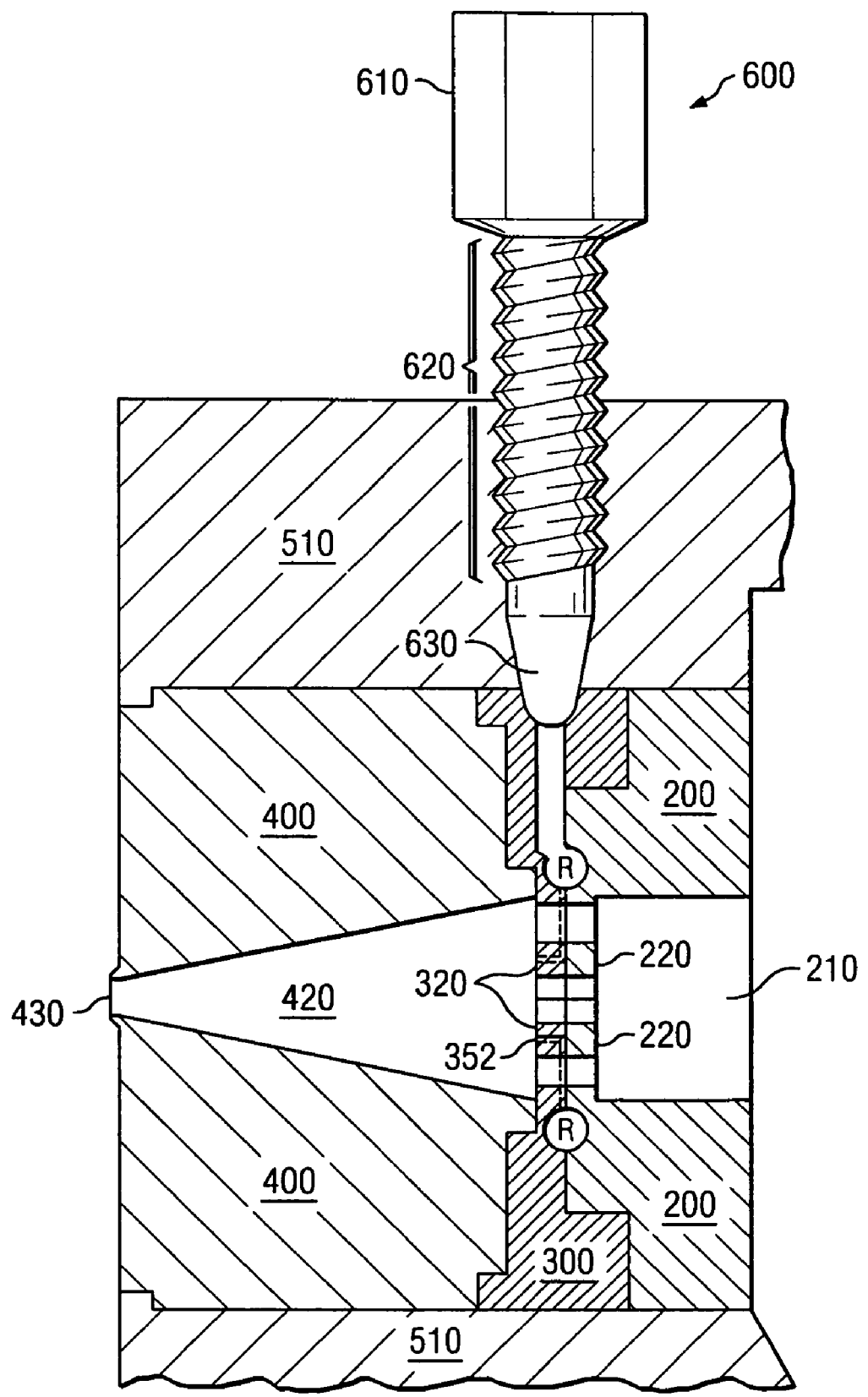
FIG. 5a is a partial sectional view of the die plate assembly taken along line 5a-5a in FIG. 4, showing the extruder die assembly and injection nozzle of the present invention properly aligned and inserted therein.
Figure 5C:
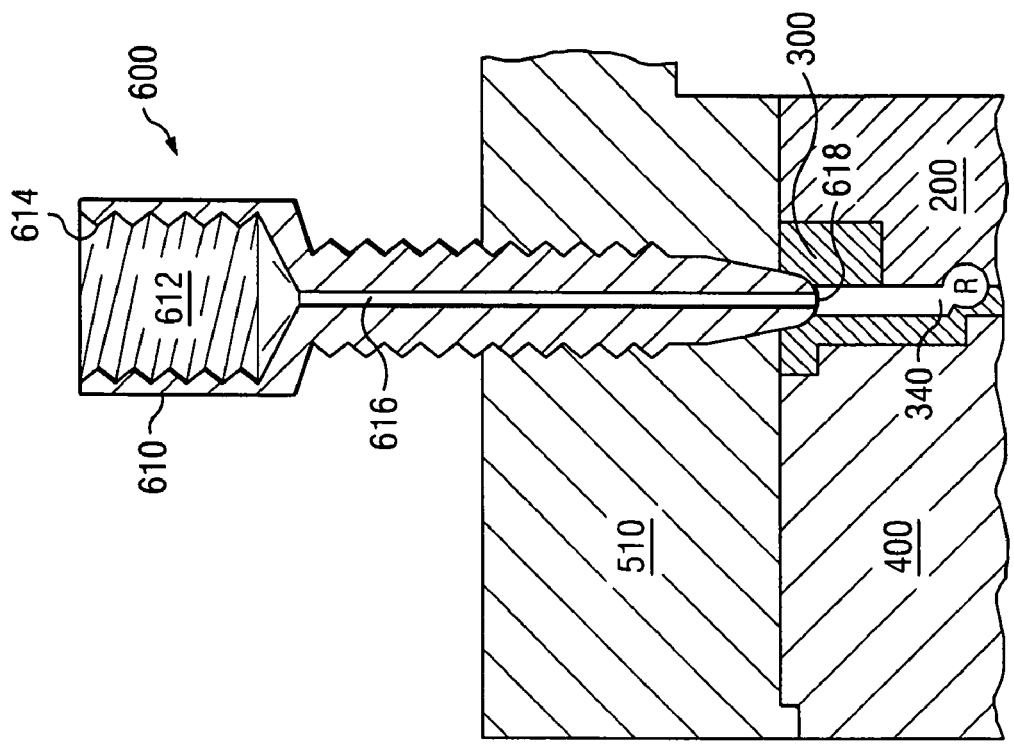
Figure 5B:
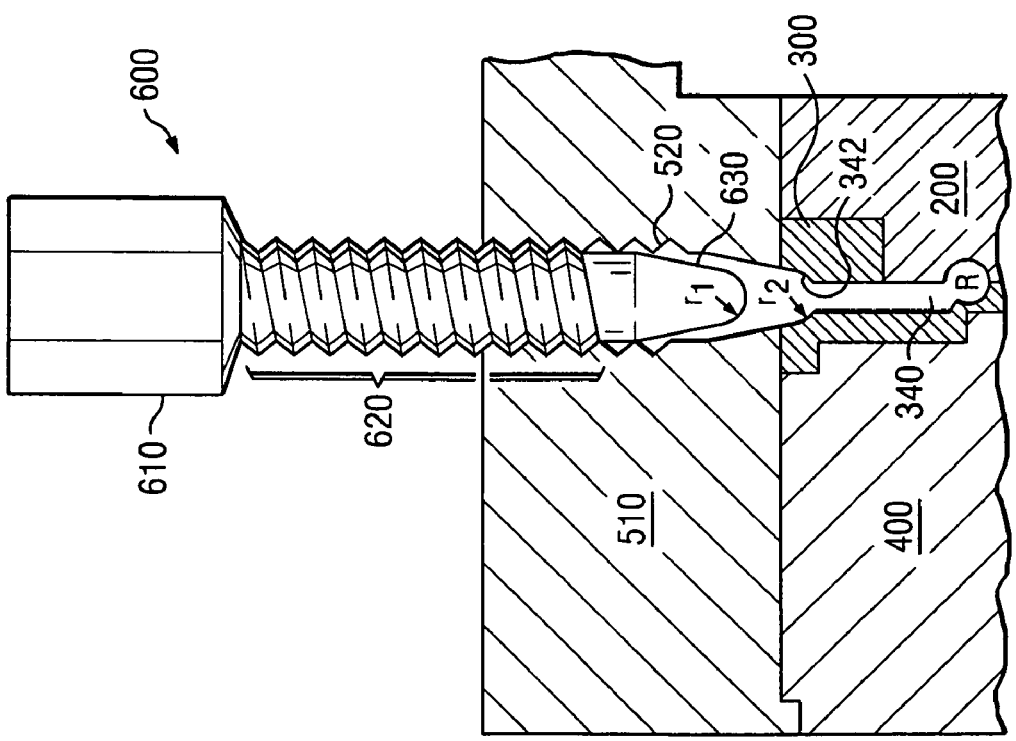
Figure 6A:
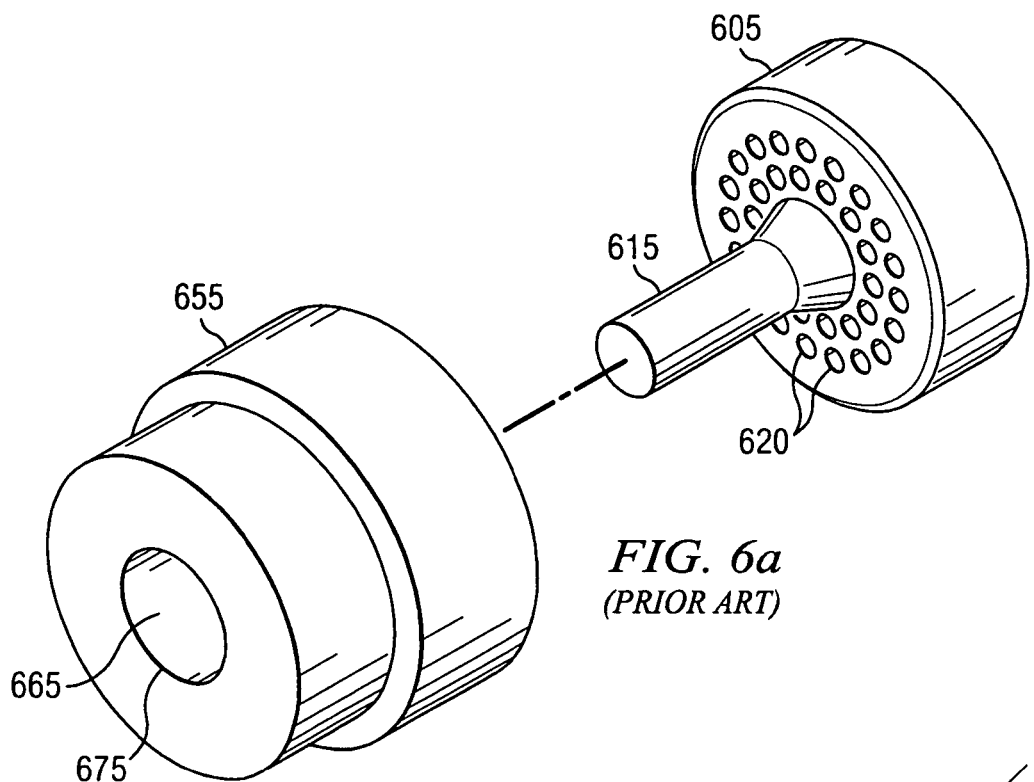
FIG. 6a is a perspective view of an embodiment of a prior art die assembly.
Figure 6B:
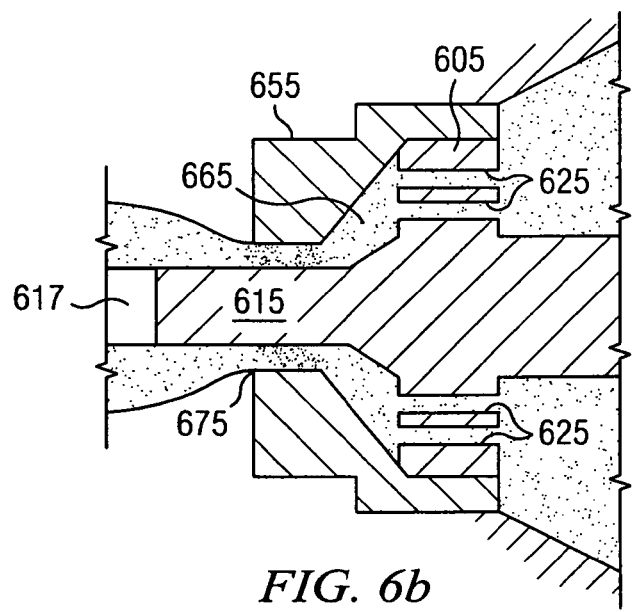
Figure 6C:
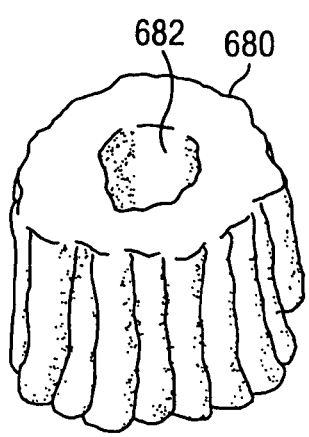
FIG. 6c depicts the resultant food piece formed from the prior art die assembly depicted in FIGS. 6a and 6b.

Referring now to the Figures, and in particular to FIGS. 5a, 5b and 5c, which depict various cross-sectional views of the die plate assembly illustrated in FIG. 4, a novel feature of the invention is shown, which comprises an injection nozzle 600 that supplies fluid additives from an exterior pressurized source to a supply port 340 formed in the injection section 300 of the extruder die assembly 100. The injection nozzle 600 of the present invention exhibits enhanced sealing characteristics while supplying pressurized fluid additives to an extruder die assembly 100 inserted in a die plate assembly attached to a conventional cooker-extruder device.

The injection nozzle 600 generally comprises an inlet section 610, a mid-section 620, and a outlet section 630. The inlet section 610 is designed to receive and couple with a pressurized additive supply line 670 so as to establish fluid communication with the exterior pressurized source. In the embodiment shown in the Figures, the inlet section 610 comprises a standard hexagonal NPT threaded female fitting which is designed to engage a conventional threaded male fitting 650 attached to the pressurized additive supply line 670.

The mid-section 620 comprises an externally threaded barrel having a smooth-bore interior passageway 616 in fluid communication with an inlet space 612 defined in the inlet section 610. The threaded mid-section 620 allows the injection nozzle 600 to be securely mounted into the threaded injection port 520 formed in the main die plate 510, thus forming a leak-proof assembly.

The outlet section 630 comprises a smooth, tapered end having a discharge port 618 at its distal end which is in fluid communication with the interior passageway 616. The diameter of the discharge port 618 is typically less than the diameter of the supply port 340. The outlet section 630 is generally paraboloididal shaped having a spherical tip of a given radius $r_1$. The spherical tip of the outlet section 630 is complementary with the spherical concavity of a given radius $r_2$ which defines the supply port inlet 342 formed in the injection section 300 of the extruder die assembly 100. The complementary shapes of the spherical tip of the outlet section 630 and the supply port inlet 342 provide a relatively larger contact area per unit volume of perforation inside the injection section 300 of the extruder die assembly 100, thereby resulting in an enhanced sealing mechanism. The resulting increase in the metal-to-metal contact between the outlet section 630 of the injection nozzle 600 and the supply port inlet 342 thereby facilitates a non-invasive fluid connection with robust sealing characteristics.

Thus, in addition to the threaded portion 614 of the inlet section 610, which effectively seals the connection between the injection nozzle 600 and the pressurized additive supply line 670, the injection nozzle 600 of the present invention exhibits a unique dual seal characteristic. First, the threaded mid-section 620 effectively seals the injection port 520 preventing extrudate from leaking out from the interior main bore 512. Second, the complementary shapes of the spherical tip of the outlet section 630 and the supply port inlet 342 effectively seals the pressurized fluid additives from leaking out to the outer periphery of the extruder die assembly 100.

The dual seal characteristic is particularly effective in conditions involving high temperature. In such conditions, components of the die plate assembly 500 typically expand, oftentimes resulting in a corresponding increase in the gap between the extruder die assembly 100 and the interior main bore 512. The dual seal characteristic of the injection nozzle 600 allows both sealing mechanisms to be adjusted, independent of one another, in response to changes induced by high temperature conditions.

Furthermore, the injection nozzle 600 of the present invention promotes a simpler and more flexible injection system. For example, while in theory a sealing thread mechanism could be extended along the entire length of the nozzle, this would require a much larger volume of perforation inside the injection section of an extruder die assembly to achieve an equivalent contact and sealing area. Moreover, to insure a continuous threaded seal, the bore of the injection port and the supply port inlet would have to be threaded concurrently, thereby dictating a matched set arrangement comprised of an injection nozzle, an injection section, and a die plate.

On the other hand, the reduced injection section perforation requirement of the injection nozzle 600 of the present invention allows greater flexibility in the number of nozzles used and the positioning of the nozzles in a particular application. Moreover, the injection nozzle 600 of the present invention allows greater simplicity while improving the flexibility of the entire system in that generic components may be fashioned so as to be essentially interchangeable with like generic components. For example, the injection nozzle 600 may standardized so as to be interchangeable with any other generic injection nozzle. The dimensions and position of the supply port inlet 342 formed in assorted injection sections may also be standardized allowing a generic injection nozzle having a standardized tip to be used with all of them. In addition, the dimensions of the threaded injection ports on the main die plate may be standardized so as to accommodate all injection nozzles having a generic threaded barrel mid-section. Likewise, the position of the threaded injection ports on the main die plate may be standardized so as to align with the supply port inlet 342 on all extruder die assemblies having a generic injection sections. Thus, by standardizing the injection nozzle 600, the injection port 520, and supply port inlet 342, extruder die assemblies having different forming die elements 220 and co-injection die inserts 320 are easily interchangeable with one another.

While the embodiment of the injection nozzle 600 illustrated in the Figures is shown as a unitary component, it is understood that other variants of the injection nozzle 600 of the present invention may be comprised of separate sections which are selectively coupled to one another.

Shapes Having Enhanced Dimensional Design Aspects

Figure 8A:
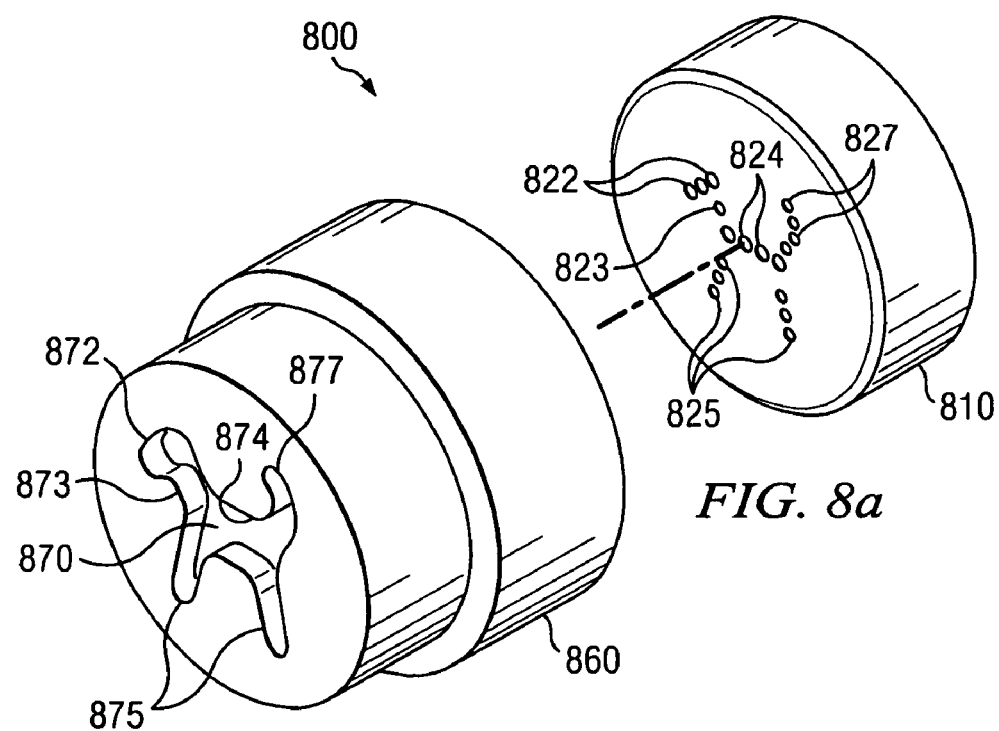
FIG. 8a is a perspective view of an embodiment of the extruder die assembly of the present invention.

FIG. 8a is a perspective view of an embodiment of the extruder die assembly of the present invention is shown. The improved extruder die assembly comprises a first die 810 and a second die 860. Although the first die 810 and second die 860 are depicted as two separate pieces that fit together, an integral die assembly 800 comprising a first die and a second die can be used.

The die assembly 800 of the present invention involves a staged pressure drop, including a first pressure drop and a second pressure drop, which consequently results in staged radial, longitudinal, and volumetric expansion. The first pressure drop occurs at the first die 810 which can be also called a breaker plate or baffle, and the second pressure drop occurs at the second die 860. The total pressure drop is the sum of the first pressure drop and second pressure drop. Most of the total pressure drop is taken in the first die 810. The pressure drop ratio is defined as the ratio of the pressure drop in the first die to the sum of the pressure drops of any subsequent dies. The pressure drop ratio is greater than at least 1.0.

The first die 810 comprises a plurality of orifices, in one embodiment, that resembles a pattern similar to the desired target shape of the extruded food product. For example, the first die assembly 800 in FIG. 8a, produces an extruded food piece in the target shape of a dog. Orifices in the first die 810, in one embodiment, correspond and substantially co-axially align with orifice sections in the second die 860. As used herein, an orifice corresponds to an opening of any shape in a die, and includes but is not limited to a slot or hole. For example, referring to FIG. 8b, a perspective view of an embodiment of the die assembly shown in FIG. 8a in operation, orifice holes depicting the head 822 of the dog shape are substantially co-axially aligned with the orifice section depicting the head 872 of the second die. Likewise, the neck orifice 823 is substantially co-axially aligned with the neck orifice area 873; the body orifices 824 (partially obscured from view) substantially co-axially align with the body orifice area 874; the leg area orifices 825 are substantially co-axially aligned with the leg orifice area 875; and the tail orifices 827 are substantially co-axially aligned with the tail orifice area 877. The size, geometry, and number of orifices indicated by numerals 822 through 827 (all relating to conductance of flow through the first die 810) can be varied to control the amount of dough flowing into a specific region of the dog shape in the second die 860. In this way, the dimensional aspects of the head, neck, body, and legs can be better controlled by orifice placement in the first die 810.

The extruder die assembly 800 of the present invention is designed for adaptation to a wide variety of commercial-grade extrusion devices common in the food industry. While the embodiment illustrated is shown as being generally cylindrical in shape, the exterior housing of the extruder die assembly may be of any shape necessary for adaptation to commercial-grade extrusion devices common in the food industry.

The extruder die assembly is inserted into the appropriate compartment within an extrusion device (not shown) and connected to a coaxially aligned supply conduit having a passageway whereby an extrudate (e.g., a paste or a cereal dough) is directed through the assembly. Although coaxial alignment is preferred in some embodiments, it is not required, and in one embodiment, the die assembly is not coaxially aligned with the supply conduit. Upon exiting the improved extruder die assembly, the extrudate is thereupon directly expanded and cut into individual pieces by a rotating die face cutter.

Figure 7A:
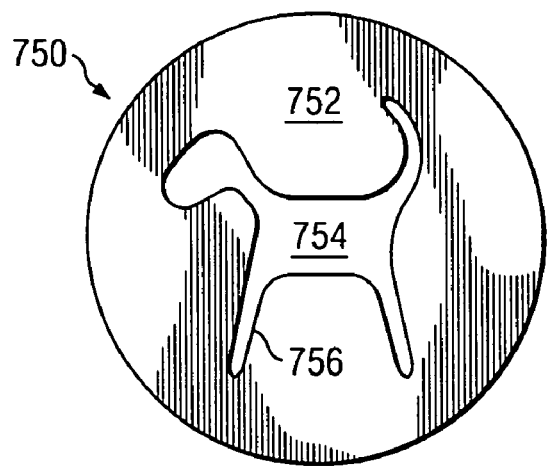
FIG. 7a is an exit face view of a potential forming die used in a prior art extruder die assembly.

Referring back to FIG. 7a, in prior art processes, when extrudate at temperatures greater than 212° F. and pressures greater than 15 psia exits the shaped exit port 754, the extrudate experiences a sudden change in pressure, causing water to change to steam vapor (typically called flash-off) and extrudate expansion occurs as the extrudate exits the die 750. As discussed above, expansion occurs in both the radial and longitudinal directions. As taught in the book "Extrusion Cooking" by Mercier, Linko, and Harper (AACC, Inc. 1989. ISBN 0-913250-67-8), a measure of the radial expansion can be quantified by sectional expansion index (SEI), which is defined as the ratio of the diameter of the extruded product to the die opening diameter. For complex shapes, the sectional expansion index can be calculated from hydraulic diameters. Similarly, a measure of the longitudinal expansion can be quantified by the longitudinal expansion index (LEI), which is defined as the ratio of the exiting velocity from the die orifice of the extruded product after expansion to its average velocity just prior to exiting the die orifice. The product of the sectional expansion index and the longitudinal expansion index is the volumetric expansion index.

Figure 8B:
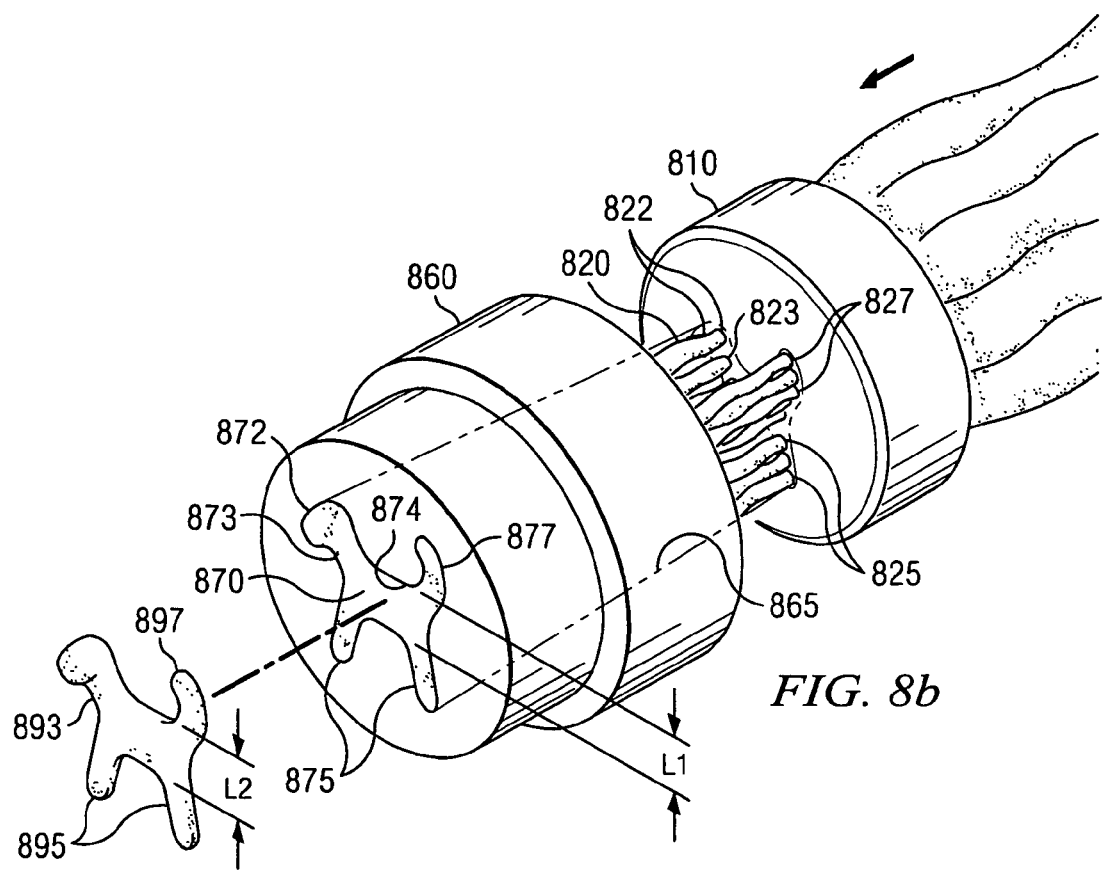
FIG. 8b is a perspective view of the embodiment of the die assembly shown in FIG. 8a in operation.

Referring to FIG. 8b, because radial expansion is partially limited by the die bore 865 (shown in phantom), the volumetric expansion occurs more proportionately through the longitudinal expansion component resulting in less radial expansion as the extrudate exits the second die 860. Hence the resultant food piece length L2 will be closer to the corresponding length L1 of the outlet die than L2 would be absent control of radial expansion during pre-expansion in the bore 865. Any radial expansion that occurs subsequent to the die outlet 870 can cause the resultant food piece to have substantially arcuate edges.

Figure 8C:
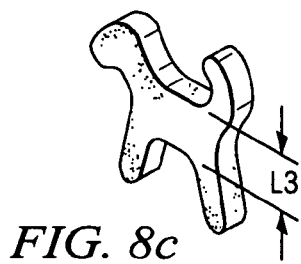
FIG. 8c is a perspective view of a resultant extruded food piece formed by one embodiment of the present invention.

In one embodiment, substantially all of the volumetric expansion occurs after the first die 810. In such an embodiment, as illustrated by FIG. 8c, substantially all radial expansion subsequent to the second die 860 is prevented. Thus, a much more specific shape can be obtained and the product will exit with substantially L-shaped edges, rather than substantially arcuate edges. Hence, the resultant food piece length L3 will be substantially equal to the corresponding length L1 of the outlet die. In sum, the direction of expansion can be controlled in the second die 860 to determine the extent, if any, of radial expansion upon exit from the second die 860. The amount of radial expansion can be achieved by creating more open volume in the die bore 865 (inlet to second die). In one embodiment, the volumetric expansion of the dough is equal to the bore volume of the second die.

As previously discussed, in prior art die assemblies, the rapid pressure loss within the extruded dough, from a condition of high pressure (greater than 1 atmosphere) to atmospheric pressure, takes place once the extruded mass has exited the die assembly. This rapid loss of pressure causes water vapor flash-off and expansion of the extruded dough in all directions. Unlike the prior art die assembly, in the present invention, a majority of the pressure drop occurs at the first die and thus a majority of the vapor formed is formed at the first die exit but within the chamber formed by the walls of the second die. This rapid loss of pressure while still within the confined space or die bore of the second die causes the dough expansion to form substantially more longitudinally rather than radially. Because the vapor and extrudate are still within the confined space of the die bore, the vapor continues to react with the dough creating sticky surfaces which bind the individual ropes from the first die into a single product. Dependent upon other process conditions, this may have a desirable effect on the surface texture and cell structure characteristics of the product.

Related to the phenomena described above, the spontaneous separation of food substances in the mixture at the transition between first die exit and second die exit has been observed. The spontaneous separation and migration of susceptible matter in the mixture can be controlled by the design of the pre-expansion die assembly. Crystalline sugar, for example, liquefied by the extrusion process, can separate from the dough and migrate to the periphery of the conduction, imparting significantly different attributes to the final extruded food product. This is of particular relevance when more than a two-stage pressure drop as discussed below is designed. Thus, although only a two-stage pressured drop is discussed, additional stages can be used by adding additional dies, orifice plates, breaker plates, baffles, etc. or by changing the pressure by some other means such as changing the pipe diameter.

In operation, in the embodiment shown in FIG. 8b, the extrudate 820 upon exiting the first die 810, pre-expands into a plurality of ropes—one rope for each orifice. The ropes, upon exiting the first die 810, expand and flash vapor. The hot, steamy dough ropes 820 are "sticky" and have a tendency to adhere to one another. As the sticky ropes 820 exit the first die 810, the ropes 820 enter into a bore 865 or channel that restricts radial expansion and facilitates adherence of the sticky ropes to one another in the bore 865 prior to exiting in the shape 870 of the second die 860. In alternative embodiments, a bore 865 configuration between said first die orifices and second die orifice is selected from the group consisting of a parallel configuration, a divergent configuration, a convergent configuration, and combinations thereof. In a preferred embodiment, a convergent configuration is used to further enhance restriction of radial expansion. A convergent configuration is also preferred for achieving bite sized food pieces. A convergent configuration is also preferred for multiple stranded products because it increases the amount of area in first die 810 for multiple orifices.

Figure 7B:
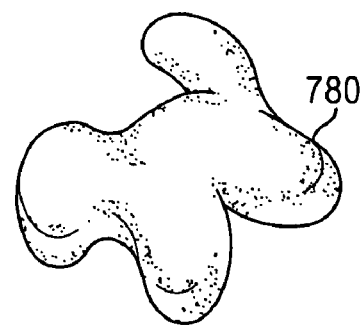
FIG. 7b depicts the resulting direct expanded food piece formed by utilizing the extrudate die assembly shown in FIG. 7a in a conventional direct expanded food process.

An advantage achieved by using the above embodiment of the die assembly is the enhanced design aspect of the definition of narrow members of the extrudate. For example, as shown on FIG. 8b, the neck 893, legs 895, and tail 897, illustrate an extrudate from the present invention, that are more defined than the same respective areas as shown on FIG. 7b, an extrudate from a prior art die assembly. Use of the novel die assembly permits shapes that more accurately portray the target shape. Thus, in one embodiment, a high definition extruded food product is made from the die assembly of the present invention.

As previously indicated, in one embodiment of the present invention, most of the total pressure drop occurs in the first die 810. The pressure drop through the first die 810 can be controlled by manipulating several factors including, but not limited to, friction factor, orifice channel length, size, shape, and number of the first die orifices. The pressure drop through the second die 860 can also be controlled by manipulating several factors including, but not limited to, friction factor, orifice channel length, convergence or divergence angle of bore 865, size and shape of the second die orifice.

Three Dimensional Shapes

Similarly, the flow velocity and flow velocity profile of the extrudate through each individual orifice can be varied by manipulating factors including, but not limited to, friction factor, orifice channel length, orifice size, orifice shape, orifice pattern (arrangement of holes), and convergence or divergence angle of bore 865. For example, FIG. 9a is a perspective view and FIG. 9b is a side view of an alternate die pattern used in an embodiment of the extruder die assembly of the present invention. The first die 910 comprises a plurality of rectangular shaped slots or orifices 920 disposed on a beveled portion 940 bounded by an outer flat circumferential area 930 and an inner flat circular area 950. The first die 910 can mate with the second die 960 having a round orifice 970. The shapes discussed herein for first die orifices 920 and second die orifices 970 are shown for purposes of illustration and not limitation. Similarly, the number of orifices comprising the first die can vary in number, shape, as well as angle of entry and exit. Moreover, the placement of the orifices need not be symmetrical.

Chapter 3 of the book "Extrusion Dies" by Walter Michaeli (Hanser. 2003. ISBN 1-56990-349-2) teaches that die conductance (K for Newtonian and K' for Non-newtonian) mathematically describes the resistance to flow for a liquid flowing through an orifice, the higher the conductance number the lower the resistance to flow. The conductance, K, is a function of the geometry of the orifice, including shape, open area, length, convergence, and wall adhesion. These geometric factors therefore describe the parameters that can be controlled within the die assembly to control flow rate and pressure drop. Their relationship with conductance being, conductance (K) is the product of volumetric flow rate ($\zeta$) and dough viscosity ($\eta$) divided by the pressure drop ($\Delta P$). Or in other words, the pressure drop ($\Delta P$) is equal to the product of the volumetric flow rate ($\zeta$) and dough viscosity ($\eta$) divided by the conductance (K). Therefore, to control the die design parameters that create pre-expansion, lowering the die conductance (K) increases the pressure drop ($\Delta P$) across a die orifice. The die conductance for various shapes of die orifices are known to those in the art, and available in Table 3.1 and FIG. 3.5 of the above referenced book.

FIG. 9c is a partially cut away perspective view of the extruder die assembly shown in FIGS. 9a and 9b. Typically, the extrudate, at a pressure greater than one atmosphere, and more typically between about 500 psig and about 2500 psig and a temperature greater than 212° F., and more typically between about 250° F. and about 425° F. is pressed against the die assembly 900. The extrudate enters the first die 910 and flows through the orifices 920. The flow rate of the extrudate through each first die orifice 920 is determined by the conductance of that orifice. The larger the orifice, the higher the conductance and the higher the flow. Conversely, the smaller the orifice, the lower the conductance, resulting in a relatively lower flow rate. Conductance can also be modified by lengthening or shortening the channel of each orifice 920. In the embodiment shown in FIG. 9c, orifices comprising channels are disposed in the beveled area 940 of the first die 910. Having a beveled area 940 is one way to achieve a varying intra-channel length. For example, the distance of channel length from the distal portion 922 of each orifice 920, namely that portion adjacent to the outer flat circumferential area 930, is longer than the channel length of the opposite side, or proximate portion of each slot 920, namely the inner portion 923 adjacent to the inner flat circular area 950. Thus, there is less conductance for dough flow at the distal radial edge 922 than at the proximate radial edge 923 of the orifice. This variable resistance, which results in one embodiment from a varying intra-channel length, causes a non-symmetrical dough velocity profile as the dough travels through the orifice channel 920. The closer the dough is to the center 950 of the first die 910, the faster the dough travels through that portion of the orifice channel 920. Likewise, the further the dough is from the center 950 of the first die 910, the slower the dough travels through that portion of the orifice channel 920. As a result the faster dough exiting the first die 910 will curl around the slower dough exiting the same orifice channel into a dough rope. Each dough rope can be adhered to one another as the ropes enter the bore 965 before proceeding to the second die exit 970 where the extrudate is cut into pieces. FIG. 9d depicts the resulting food piece formed by using the extruder die assembly shown in FIGS. 9a-9c. As shown in FIG. 9d, a food product piece mimicking the target shape of a piece of popcorn is achieved. Thus, in one embodiment, an asymmetrical three-dimensional extruded food product is made from the die assembly of the instant invention.

Figure 9E:
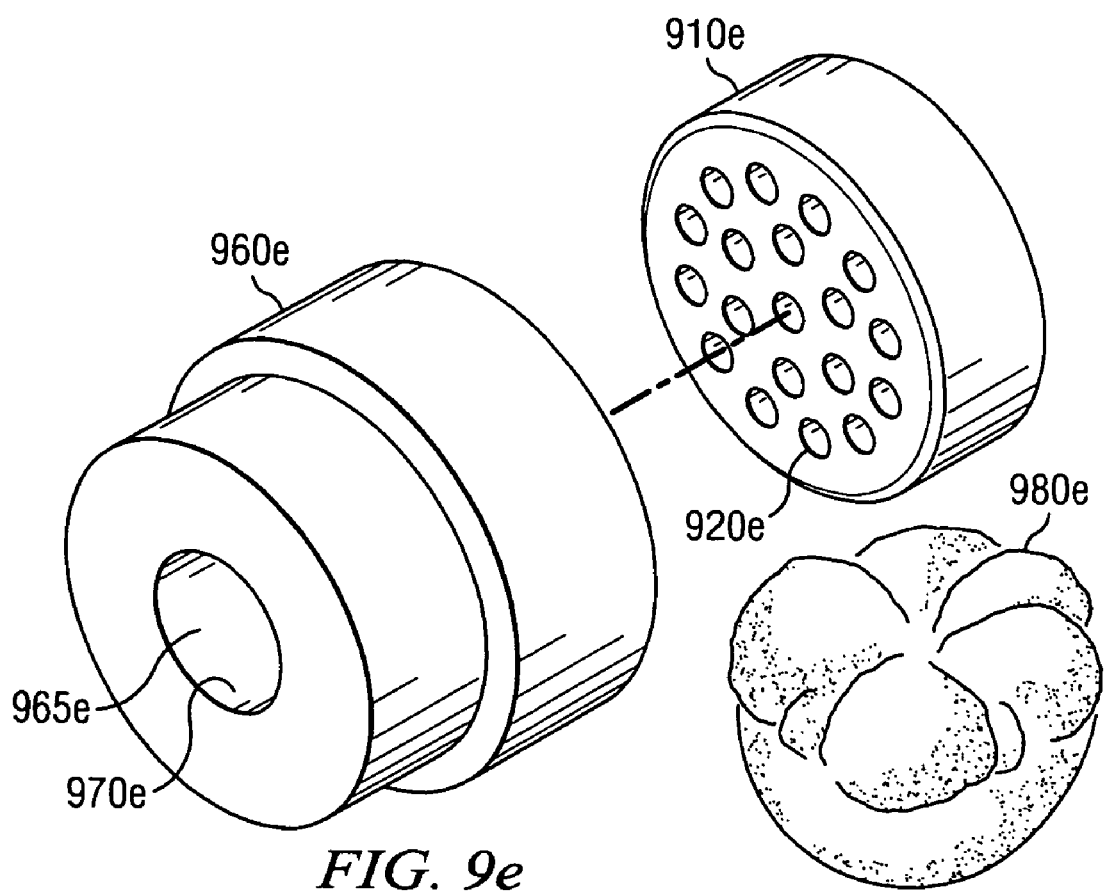
FIG. 9e depicts an embodiment of the extruder die assembly of the present invention and the resulting extruded food piece formed.

FIG. 9e depicts an embodiment of the extruder die assembly of the present invention and the resulting extruded food piece formed. In this embodiment, pre-expanded dough extruded through the first die 910e orifices 920e comprises a plurality of ropes, which then are sent through a converging section 965e before exiting the second die 970e as a three-dimensionally shaped extruded food piece 980e. Conductance can also be modified by adjusting the angles of the orifice inlet or the orifice outlet. Alternatively, the entrance angles can be eliminated and a rounded inlet can be used. The entrance can also be tapered.

Texture Aspects

Figure 10A:
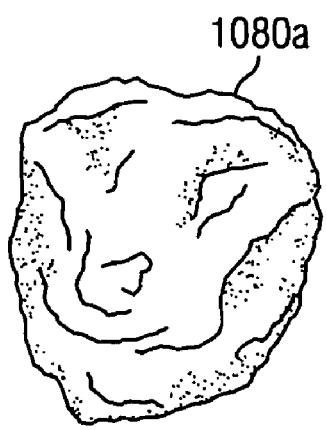
FIG. 10a depicts an example of a food product extruded from a second die having a high coefficient of friction.

Appearance can be modified by changing the coefficient of friction of the orifice channels. The higher the coefficient of friction on an inner die wall surface, the rougher the surface finish of the food product piece. As used herein, a high coefficient of friction is defined as a coefficient of friction above about 0.80. A high coefficient of friction slows movement of the outer surface of the dough (wall dough), or the dough traveling adjacent the die wall. The inner dough travels at faster speeds causing the wall dough to tear away from the inner dough due to shear forces. Thus, a rough surface results upon exit from the second die. A steel surface having a roughness average greater than 125 micro inches per ANSI B46.1 can provide a high coefficient of friction. FIG. 10a depicts an example of a food product 1080a extruded from a second die having a high coefficient of friction. As depicted in the Figure, the food product extruded through a second die having a high coefficient of friction contains numerous randomly spaced wrinkles on the outer surface.

Figure 10B:
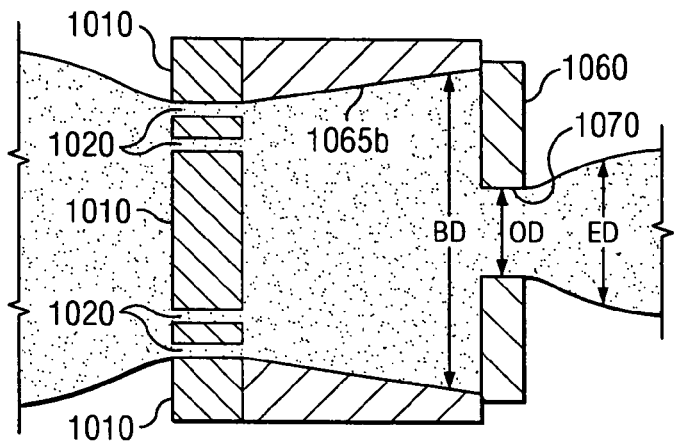
FIG. 10b-d depict three cross-sections of an extruder die assembly having a step change and the resulting extruded food piece formed in accordance with an embodiment of the present invention.
Figure 10C:
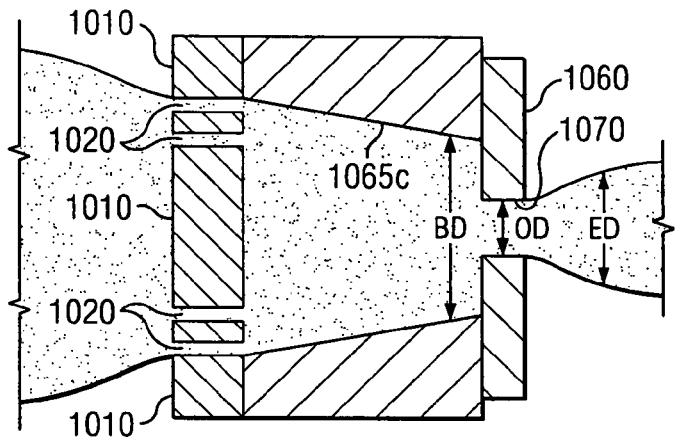
Figure 10D:
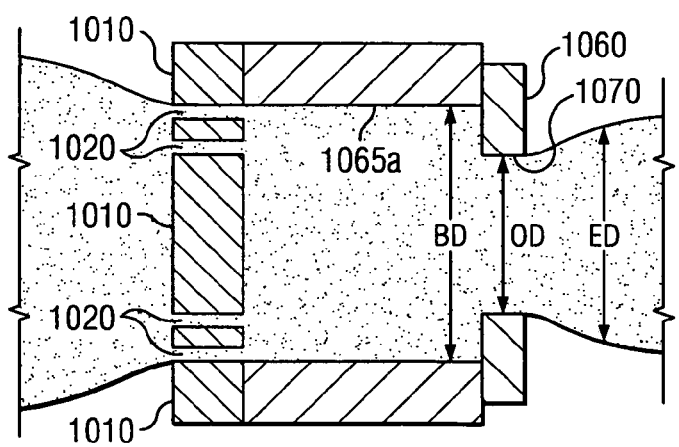
Figure 10E:
FIG. 10e depicts an example of a food product extruded from a second die having a step change.

In one embodiment, a step change is used to create an extruded food product having a rough texture or an irregular texture. FIG. 10b depicts three cross-sections of an extruder die assembly having a step change and the resulting extruded food piece formed in accordance with an embodiment of the present invention. As used herein, a step change occurs when the bore diameter BD immediately adjacent to the second die is greater than the second die diameter OD. Each cross-section depicts a first die 1010 having a plurality of first die orifices 1020 and a second die 1060 having a second orifice 1070. In one aspect, pre-expansion of the dough occurs in a die bore having a parallel configuration 1065a. In other aspects, pre-expansion of the dough occurs in a die bores having a divergent 1065b or a convergent configuration 1065c. Each bore has a bore diameter BD adjacent to the orifice diameter OD. Thus, a step change can occur by using any bore configuration that leads to an orifice 1070 at the second die having an orifice diameter OD smaller than the adjacent bore diameter BD. The step change from the bore diameter BD to the orifice diameter OD causes tearing as the pre-expanded dough is extruded through the second die orifice 1070, resulting in an extruded food product 1080b having a rough texture.

In an embodiment similar to that discussed above in reference to FIG. 8c, substantially all the volumetric expansion occurs after the first die 1010 in a die bore 1065a 1065b 1065c. In such an embodiment, because substantially all radial expansion subsequent to the second 1060 is prevented, the resultant extrudate diameter ED exiting the second die 1060 is substantially equal to the second die orifice 1070 diameter OD. A second die having a relatively low coefficient of friction on the inner die wall surface results in a smooth surface finish on the food product piece due to the resultant flow velocity profile. As used herein, a low coefficient of friction is defined as a coefficient of friction below about 0.20. A material having an average roughness of less than 32 micro inches per ANSI B46.1 can provide a relatively low coefficient of friction. The low coefficient of friction can be accomplished by a variety of methods including, but not limited to, a polished, machined surface, electroplating, or by using a low coefficient coating such as Teflon®. A second die having a coefficient of friction between about 0.20 and 0.80 can produce extrude food pieces having a standard surface finish.

Other Shapes

Figure 11A:
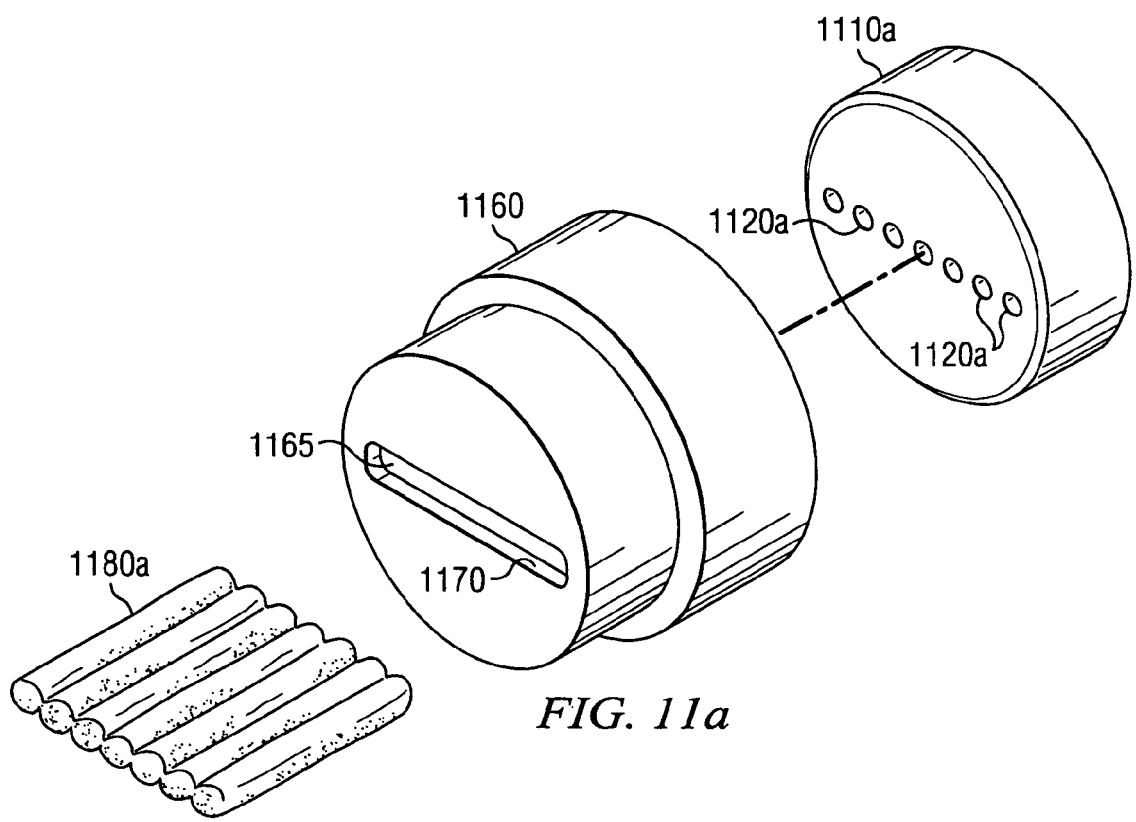
FIGS. 11a-b depict exemplary embodiments of the extruder die assembly of the present invention and the resulting extruded food piece formed.
Figure 11B:
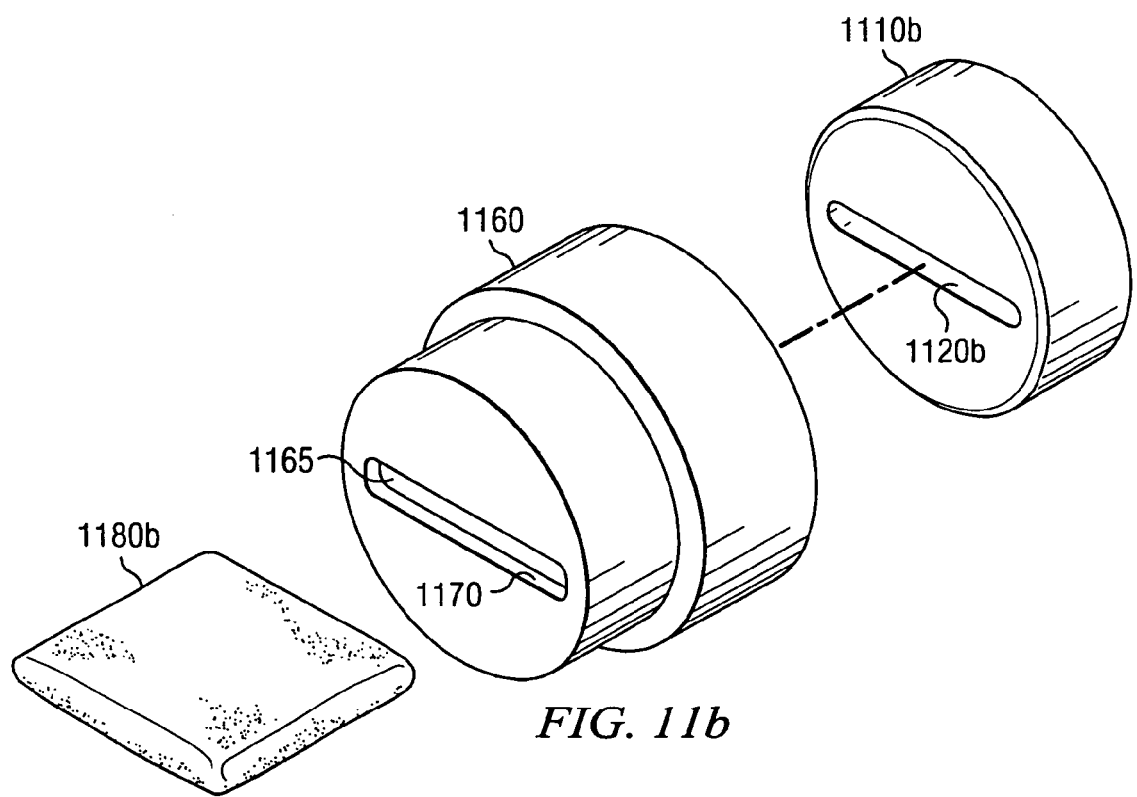

FIG. 11a-b depicts exemplary embodiments of the extruder die assembly of the present invention and the resulting extruded food piece formed. In one embodiment, dough is extruded through the first die 1110a orifices 1120a to make a plurality of ropes and then routed through a converging bore 1165 before exiting the second die 1170 as a flat square extruded food piece 1180a. The resultant extruded food product 1180a is a substantially flat square or rectangle. Absent pre-expansion, the resultant extruded food product 1180a would have wrinkling due to radial expansion. In an alternative embodiment, an alternate first die 1110b having a single slot 1120b is used to produce a similarly shaped food product 1180b. Hence, a single or multi-stranded pre-expanded extruded dough of various geometries can be formed into a desired shape having a desired texture and then cut by a rotating die face cutter. In yet another embodiment, the first die orifice and second die orifice can be substantially square or rectangular in shape. In such an embodiment, if substantially all radial expansion occurs prior to exit from the second die in a die bore disposed between the two orifices, an extrudate mimicking a porous, bread-like appearance can be made and cut with a die face cutter. In one embodiment, a porous food product having a visible open cellular structure is made. Further, in one embodiment, the first die can comprise a forming die element that mates with a co-injection die insert to combine color and/or flavor with the novel shape characteristics of the extrudate produced from the instant invention. Thus, the outer edges could be darkened to further mimic the appearance of a sliced piece of bread.

Figure 12A:
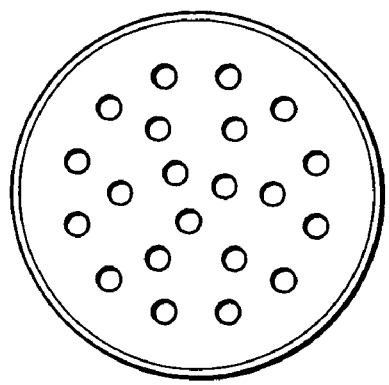
FIGS. 12a-12f depict examples of first dies that can be used in the extruder die assembly in accordance with various embodiments of the present invention.
Figure 12B:
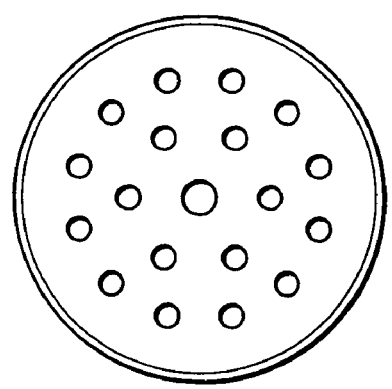
Figure 12C:
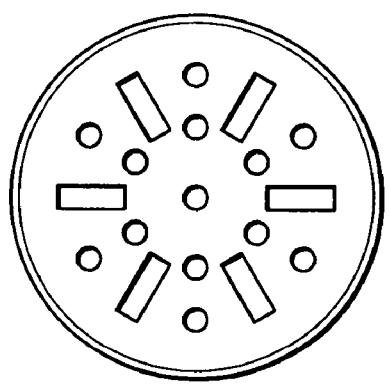
Figure 12D:
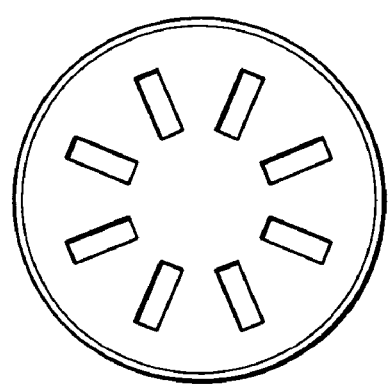
Figure 12E:
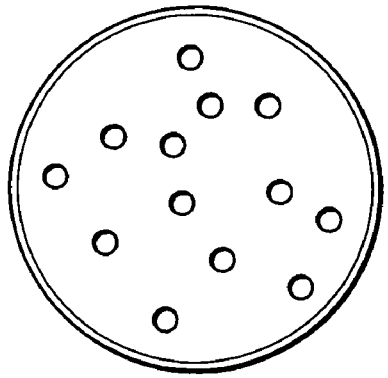
Figure 12F:
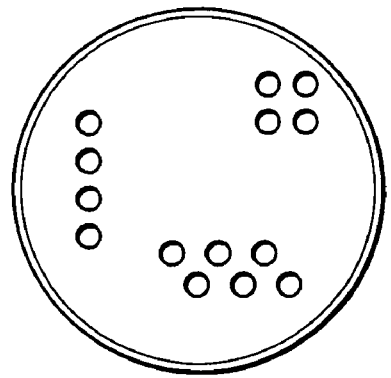

FIG. 12a-12f depict examples of first dies that can be used in the extruder assembly in various embodiments of the present invention. As shown in FIGS. 12a-12f, numerous patterns of orifice sizes and geometries can be utilized as a first die. For example, as shown in FIG. 12b, at least one (center orifice) of a plurality of first die orifices comprises a different cross-sectional area. As shown in FIG. 12c, at least one of a plurality of orifices comprises a different shape. Again, the shapes discussed herein for first die orifices are shown for purposes of illustration and not limitation. First die orifice shapes can be selected from the group consisting of square, oval, rectangle, circle, semi-circle, triangle, trapezoid, crescent, and combinations thereof. Furthermore, as illustrated by FIG. 8a, the first die orifice pattern can resemble target shapes. The patterns discussed herein are given for purposes of illustration and not limitation. First die patterns can be selected from the group consisting of letters, plants, animals, shapes, and combinations thereof. As shown in FIGS. 12e and 12f, first die orifices can be arranged in a non-symmetrical pattern.

Shapes with Color/Flavor Injection

Figure 13:
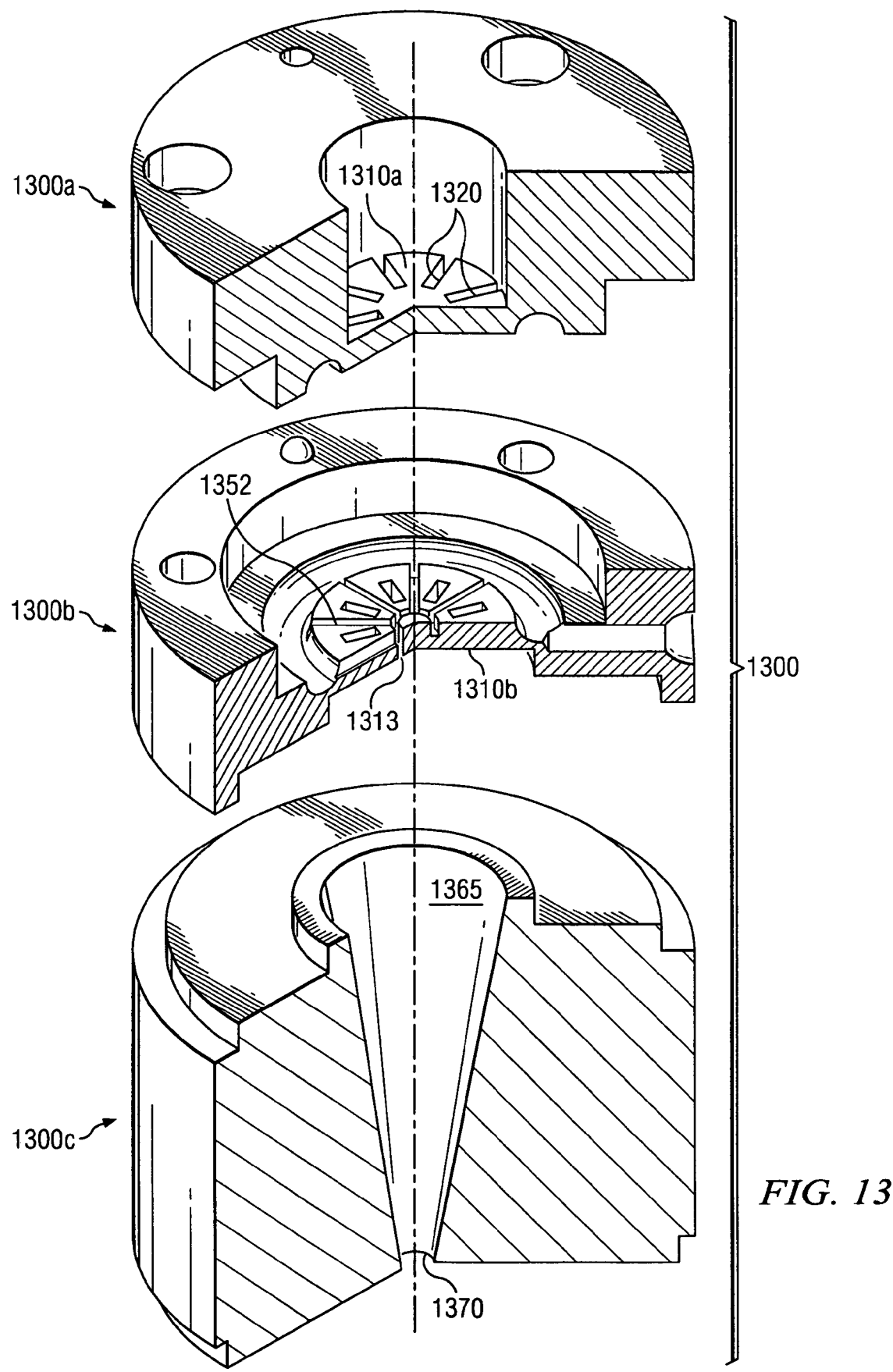
FIG. 13 is a cutaway exploded perspective view of one embodiment of the extruder die assembly having co-injection capabilities.

FIG. 13 is a cut-away exploded perspective view of one embodiment of the die assembly of the present invention having co-injection capabilities. FIG. 13 illustrates one example of how the first die can comprise a forming die element 1310a that mates with a co-injection die insert 1310b to combine color and/or flavor with the novel shape characteristics of the extrudate produced from the instant invention. The injection die insert 1310b further comprises at least one capillary channel 1352 in the space between the plurality of orifices 1320 in communication with at least one injection port outlet to enable at least one color (food dye) and/or at least one flavor, or other food substance to be co-injected into selected portions of the extrudate substantially at the first die 1310a, 1310b. Although an injection port outlet 1313 can be directed towards the die inlet 1310a or within various orifice 1320 channels, or at the first die exit (as shown), it is preferably directed at the first die exit to avoid clogging.

As previously indicated, several of these configurations can be stacked upon in order to achieve multiple color, or flavor effects. Other food substances can also be used in addition to food dyes and flavors, for example edible oils acting as lubricants, to achieve a particular product design. Thus, numerous shapes having an enhanced quality of dimensional design aspects can be colored to even further enhance the representation of an extruded food product. For example, a first die comprising a forming die element mated with a co-injection die insert having a plurality of first die orifices and a second die orifice patterned in the shape of a zebra can be used to produce an extruded food piece having black stripes in the shape of a zebra. Similarly, an orange color and a black color could be injected into a plurality of first die orifices patterned in the shape of a tiger. Shades of green could be injected into a plurality of first die orifices patterned in the shape of a snake.

As previously indicated, conductance through the orifices 1320 of the first die 1310a, 1310b can be manipulated by adjusting the length and/or friction factor of the orifice 1320 channel, by placement of the orifices 1320 within the first die 1310a, 1310b, by the open surface area (size) of each orifice 1320, and/or by the curvature of each orifice 1320 inlet. The resistance can also be changed by injecting a gas or liquid fluid in selected portions of an orifice 1320 channel. After exiting the first die 1310a, 1310b, the extrudate passes through a converging bore 1365 in the nozzle section 1300c of the die assembly 1300 prior to exiting the second orifice 1370. A more detailed description of a co-injection die assembly is presented in U.S. patent application Ser. No. 10/623,048 filed on Jul. 18, 2003, which is incorporated by reference.

It will now be evident to those skilled in the art that there has been described herein an improved extruder die apparatus and method for imparting a distinct colored and/or flavored pattern into an extrudable food mass during extrusion. Moreover, an injection nozzle having enhanced sealing characteristics and facilitating a non-invasive fluid connection to the improved extruder die apparatus has also been described. Further, it will be evident to those skilled in the art that an improved extruder die apparatus and method for complexly shaped food products having an enhanced quality of dimensional design aspect has been described herein. Although the invention hereof has been described by way of a preferred embodiment, it will be evident that other adaptations and modifications can be employed without departing from the spirit and scope thereof. For example, multiple extrusion die assemblies may be utilized in a parallel arrangement by a single extruder device. The terms and expressions employed herein have been used as terms of description and not of limitation; and thus, there is no intent of excluding equivalents, but on the contrary it is intended to cover any and all equivalents that may be employed without departing from the spirit and scope of the invention.

In sum, while this invention has been particularly shown and described with reference to a preferred embodiment, it will be understood by those skilled in the art that various changes, in form and detail may be made therein without departing from the spirit and scope of the invention.

What is claimed is:

1. A method for making an extruded food product having a desired target shape said method comprising the steps of:
   a) supplying a first die comprising a plurality of first die orifices wherein said first die orifices are configured to obtain said desired target shape;
   b) supplying a second die having one and only one second die orifice wherein said second die orifice is configured to obtain said desired target shape, wherein said second die is connected to said first die;
   c) extruding a dough through said first die having a first pressure drop into a bore disposed between the first die and second die thereby:
      forming a pre-expanded dough rope at each said first die orifice from said dough;
      flashing vapor from each said pre-expanded dough rope;
      restraining expansion in a radial direction with said bore disposed between the first die and second die; and
   d) extruding said pre-expanded dough ropes through said second die having a second pressure drop thereby forming an extruded food product having said desired target shape.

2. The method of claim 1 wherein said first die at step a) further comprises a forming die element mated with an injection die insert comprising an annular reservoir manifold.

3. The method of claim 2 wherein said injection die insert further comprises at least one capillary channel in communication with at least one injection port outlet.

4. The method of claim 3 wherein at least one flavor is injected through said injection port outlet.

5. The method of claim 3 wherein at least one color is injected through said injection port outlet.

6. The method of claim 3 wherein at least one food substance is injected through said injection port outlet.

7. The method of claim 1 wherein at least one of said first die orifices at step a) is selected from the shapes consisting of square, oval, rectangle, circle, semi-circle, triangle, trapezoid, crescent, and combinations thereof.

8. The method of claim 1 wherein said target shape at step a) is selected from the group consisting of letters, plants, animals, shapes, and combinations thereof.

9. The method of claim 1 wherein at least one of said first die orifices at step a) comprises a varying intra-channel length.

10. The method of claim 1 wherein at least one of said plurality of said first die orifices at step a) comprises a different cross sectional area than at least one remaining first die orifice.

11. The method of claim 1 wherein said at least one of said plurality of said first die orifices at step a) comprises a different channel length than at least one remaining first die orifice.

12. The method of claim 1 wherein at least one of said plurality of said first die orifices at step a) comprises a shape that is different from the shape of the remaining said first die orifices, and wherein said shapes of all said first die orifices are selected from the group of shapes consisting of square, oval, rectangle, circle, semi-circle, triangle, trapezoid, crescent, and combinations thereof.

13. The method of claim 1 wherein at least one of said plurality of said first die orifices at step a) comprises a different coefficient of friction from the remaining said first die orifices.

14. The method of claim 1 wherein said second die orifice at step b) comprises a step change.

15. The method of claim 1 wherein said second die at step b) comprises a friction coefficient wherein said friction coefficient is chosen based upon desired texture.

16. The die assembly of claim 1 wherein the first pressure drop at step c) creates separation and migration of at least one food substance in said dough in said bore.

17. The method of claim 1 wherein said bore at step c) comprises a convergent bore configuration.

18. The method of claim 1 wherein substantially no radial expansion occurs during the extruding at step d).

19. The method of claim 1 further comprising the step of:
  e) cutting said extruded food product with a rotating face cutter.

20. A method for making an extruded food product having a desired target shape said method comprising the steps of:
  a) supplying a first die comprising at least one first die orifice wherein said first die orifice is configured to obtain said desired target shape;
  b) supplying a second die having a second die orifice wherein said second die orifice is configured to obtain said desired target shape, wherein said second die is connected to said first die;
  c) extruding a dough through said first die having a first pressure drop into a bore having a convergent configuration disposed between the first die and second die thereby:
    forming a pre-expanded dough rope at each said first die orifice from said dough;
    flashing vapor from said pre-expanded dough rope;
    restraining expansion in a radial direction with said bore disposed between the first die and second die; and
  d) extruding said pre-expanded dough rope through said second die having a second pressure drop thereby forming an extruded food product having said desired target shape.

* * * * *